US010782060B2

(12) United States Patent
Jeong et al.

(10) Patent No.: US 10,782,060 B2
(45) Date of Patent: Sep. 22, 2020

(54) EVAPORATOR, A REFRIGERATOR USING THE EVAPORATOR AND A METHOD FOR CONTROLLING THE REFRIGERATOR

(71) Applicant: Samsung Electronics Co., Ltd, Gyeonggi-do (KR)

(72) Inventors: Jin Jeong, Gyeonggi-do (KR); Kook Jeong Seo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/509,189

(22) PCT Filed: Mar. 18, 2015

(86) PCT No.: PCT/KR2015/002636
§ 371 (c)(1),
(2) Date: Mar. 6, 2017

(87) PCT Pub. No.: WO2016/035958
PCT Pub. Date: Mar. 10, 2016

(65) Prior Publication Data
US 2017/0276419 A1    Sep. 28, 2017

(30) Foreign Application Priority Data
Sep. 5, 2014   (KR) .................. 10-2014-0119075

(51) Int. Cl.
*F25D 11/00*    (2006.01)
*F28D 20/02*    (2006.01)
(Continued)

(52) U.S. Cl.
CPC .......... *F25D 11/006* (2013.01); *F25B 39/024* (2013.01); *F25D 11/02* (2013.01);
(Continued)

(58) Field of Classification Search
CPC ........ F25D 11/006; F25D 17/04; F25D 11/02; F25D 17/065; F25D 29/00;
(Continued)

(56) References Cited

U.S. PATENT DOCUMENTS 4,393,918 A * 7/1983 Patry .................. F25D 3/00
165/10
4,459,826 A * 7/1984 Hirano ............... F25D 11/006
62/276
(Continued)

FOREIGN PATENT DOCUMENTS

CN    103175362 A    6/2013
EP    0974794 A2     1/2000
(Continued)

OTHER PUBLICATIONS

International Search Report dated Jun. 25, 2015 in connection with International Application No. PCT/KR2015/002636, 4 pages.
(Continued)

*Primary Examiner* — Christopher R Zerphey

(57) ABSTRACT

Disclosed are an evaporator, a refrigerator using the evaporator, and a method for controlling the refrigerator. The evaporator includes a refrigerant evaporation unit in which a flow passage where a refrigerant evaporates is formed, and a phase change material (PCM) accommodation unit that is coupled to the refrigerant evaporation unit and accommodates the PCM whose phase is changed according to latent heat absorbed by the refrigerant, wherein the PCM is brought into direct contact with an outer surface of the refrigerant evaporation unit inside the PCM accommodation unit.

18 Claims, 25 Drawing Sheets

(51) Int. Cl.
*F28D 9/00* (2006.01)
*F28D 1/03* (2006.01)
*F28F 3/14* (2006.01)
*F25B 39/02* (2006.01)
*F25D 23/12* (2006.01)
*F25D 17/06* (2006.01)
*F25D 17/04* (2006.01)
*F25D 11/02* (2006.01)
*F25D 29/00* (2006.01)
*F28D 21/00* (2006.01)
*F28D 20/00* (2006.01)

(52) U.S. Cl.
CPC ........... *F25D 17/04* (2013.01); *F25D 17/065* (2013.01); *F25D 23/12* (2013.01); *F25D 29/00* (2013.01); *F28D 1/035* (2013.01); *F28D 9/0037* (2013.01); *F28D 20/021* (2013.01); *F28F 3/14* (2013.01); *F25B 2400/24* (2013.01); *F25D 2700/122* (2013.01); *F28D 2020/0013* (2013.01); *F28D 2021/0071* (2013.01); *Y02E 60/145* (2013.01)

(58) Field of Classification Search
CPC ........... F25D 2700/122; F25D 2201/14; F25D 11/022; F25D 21/06; F25D 3/08; F25D 23/04; F25D 2400/04; F25D 2303/08; F25D 23/062; F25D 16/00; F25D 2201/11; F25D 2201/022; Y10S 62/13; F25B 5/02; F28D 20/021; F28D 20/025; F28D 20/02
USPC .......................................................... 62/452
See application file for complete search history.

(56) References Cited

U.S. PATENT DOCUMENTS

| | | | | |
|---|---|---|---|---|
| 4,951,481 A | * | 8/1990 | Negishi | F25D 3/06 62/406 |
| 5,860,287 A | * | 1/1999 | O'Neal | F25D 16/00 62/201 |
| 6,253,567 B1 | * | 7/2001 | Imanari | F24F 5/0017 165/150 |
| 7,406,998 B2 | * | 8/2008 | Kudo | F28D 20/02 165/10 |
| 9,046,287 B2 | * | 6/2015 | Litch | F25B 39/02 |
| 10,337,805 B2 | * | 7/2019 | Suzuki | F28D 20/02 |
| 2012/0204597 A1 | * | 8/2012 | Karl | F28D 1/05366 62/529 |
| 2013/0019623 A1 | * | 1/2013 | Jo | F25D 11/025 62/190 |
| 2013/0160484 A1 | * | 6/2013 | Lee | F25D 11/006 62/452 |
| 2013/0289680 A1 | * | 10/2013 | Hasegawa | A41D 13/0058 607/112 |
| 2016/0109187 A1 | * | 4/2016 | Houdek | F28F 1/40 165/10 |
| 2017/0314839 A1 | * | 11/2017 | van Beek | F25D 11/006 |
| 2018/0306525 A1 | * | 10/2018 | Kitou | F28F 1/40 |

FOREIGN PATENT DOCUMENTS

| | | |
|---|---|---|
| EP | 1733906 A2 | 12/2006 |
| EP | 2607820 A2 | 6/2013 |
| EP | 2784419 A1 | 10/2014 |
| JP | 2003207258 A | 7/2003 |
| JP | 2015014401 A | 1/2015 |
| JP | 2015087041 A | 5/2015 |
| KR | 1019970028248 A | 6/1997 |
| KR | 1020040081288 A | 9/2004 |
| KR | 1020130071576 A | 7/2013 |

OTHER PUBLICATIONS

Written Opinion of the International Searching Authority dated Jun. 25, 2015 in connection with International Application No. PCT/KR2015/002636, 12 pages.
Extended European Search Report for European Patent Application No. 15837466.0 dated Mar. 28, 2018; 5 pages.
European Patent Office, "Supplementary European Search Report," Application No. 17763530.7, dated Jan. 31, 2019, 8 pages.
State Intellectual Property Office of the People's Republic of China, "The First Office Action," Application No. CN 201580056546.1, dated Jan. 30, 2019, 16 pages.
Office Action dated Jul. 4, 2019 in connection with Chinese Patent Application No. 201580056546.1, 12 pages.
Rejection Decision in connection with Chinese Application No. 201580056546.1 dated Dec. 10, 2019, 12 pages.

* cited by examiner

[Fig. 1]
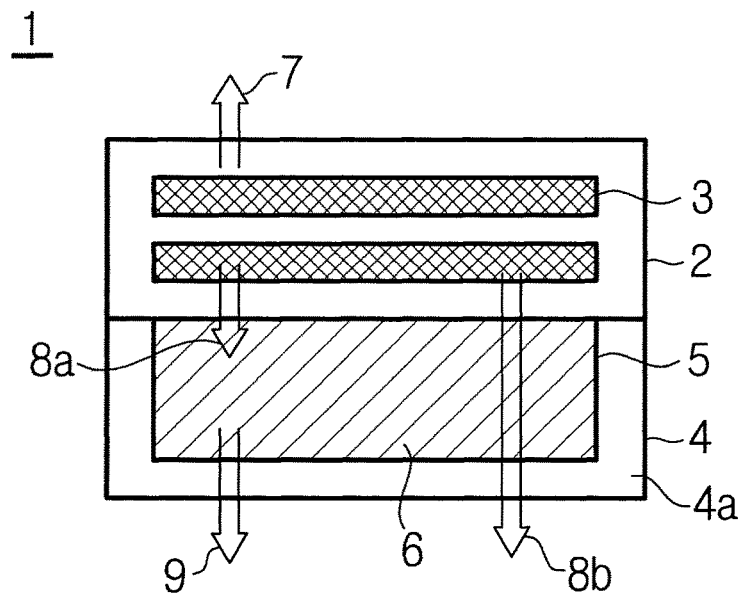
[Fig. 2]
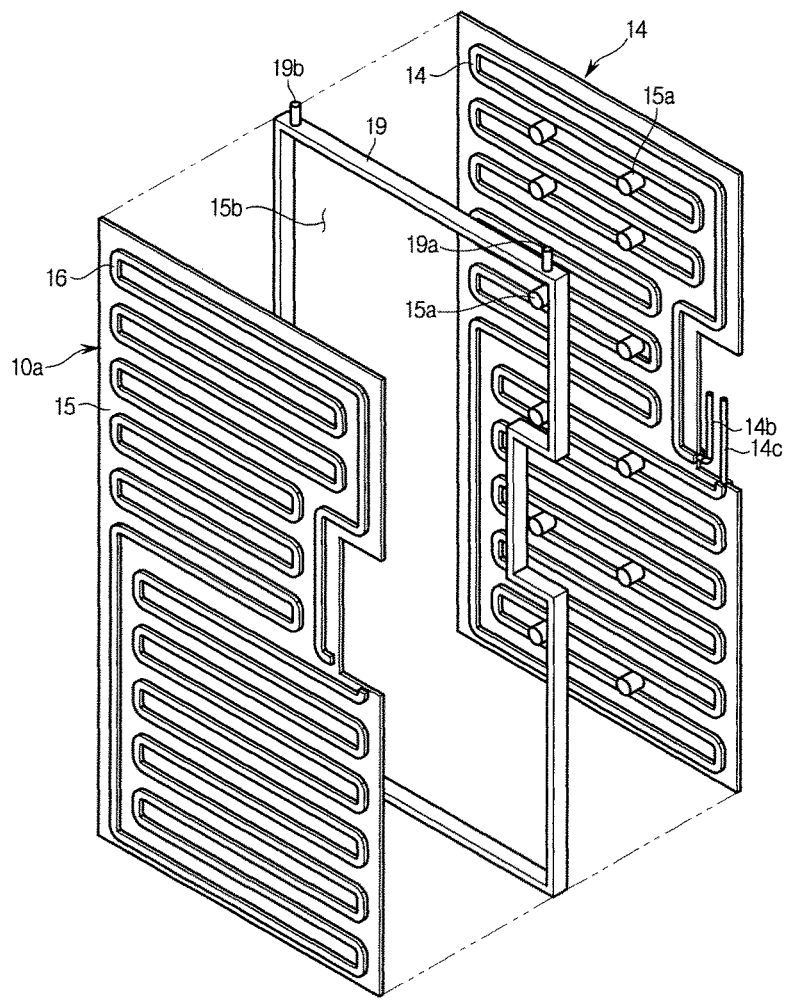

[Fig. 3]
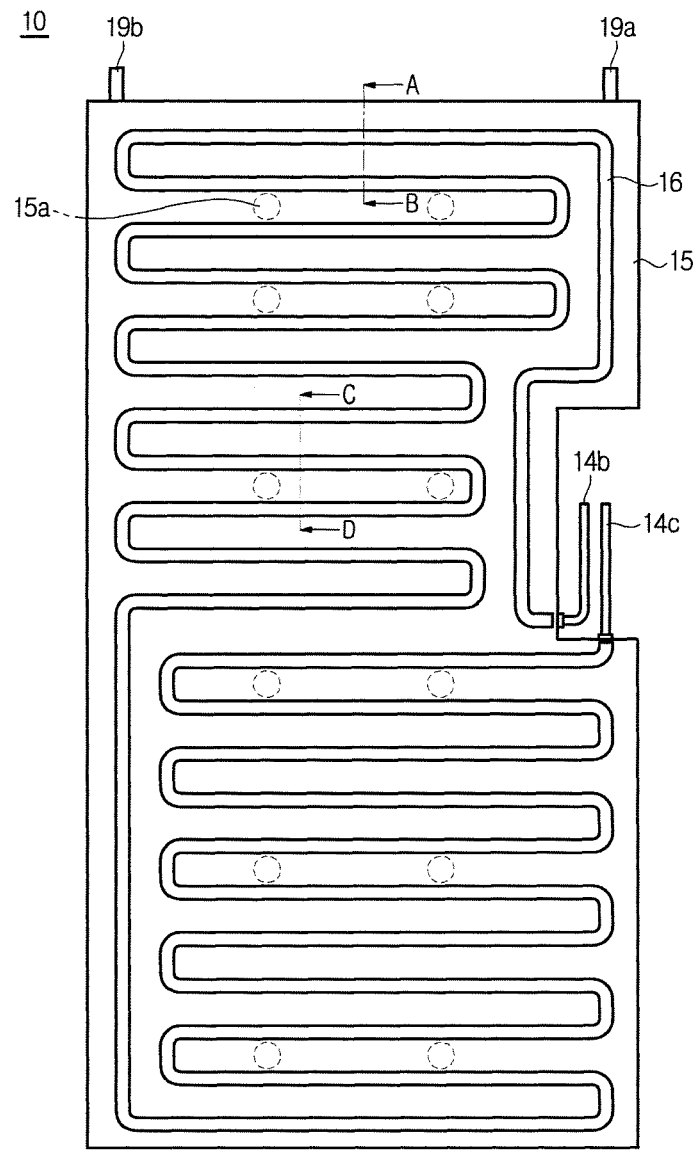
[Fig. 4]
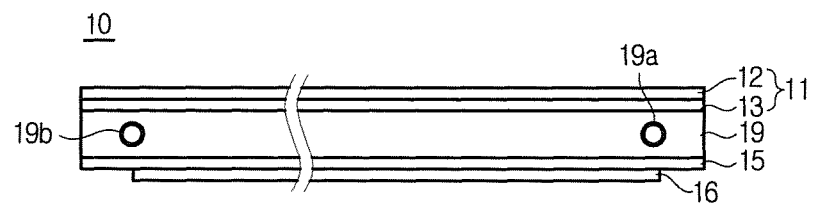

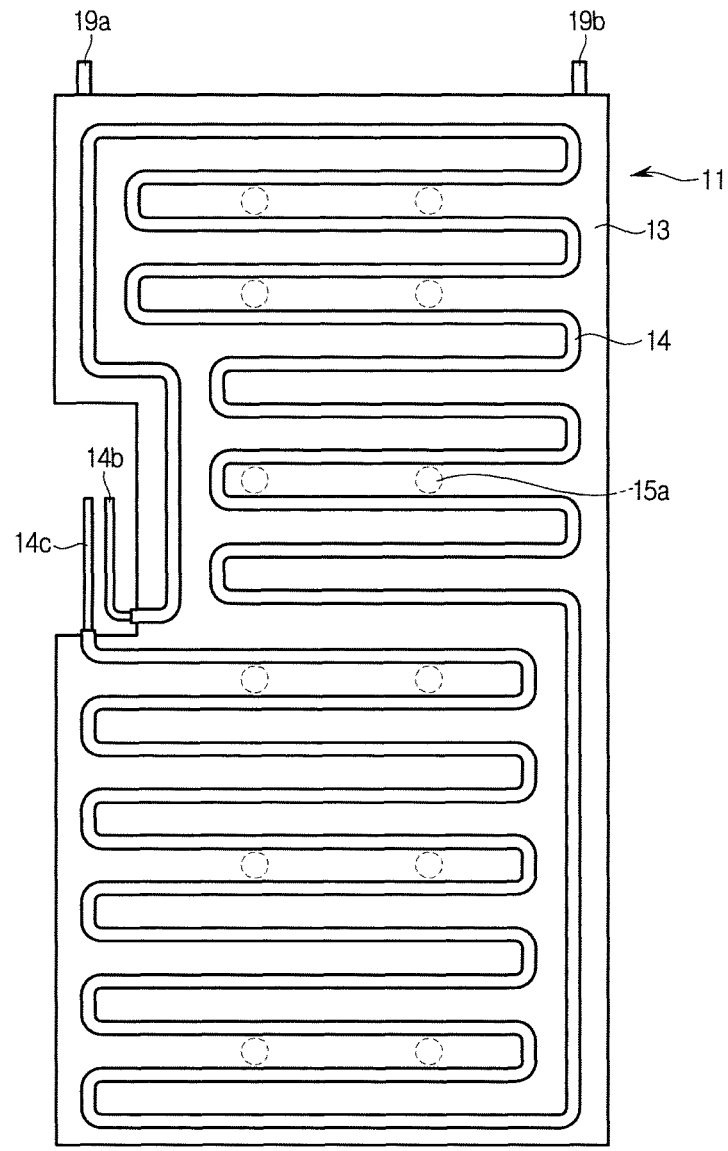
[Fig. 5]

[Fig. 6]
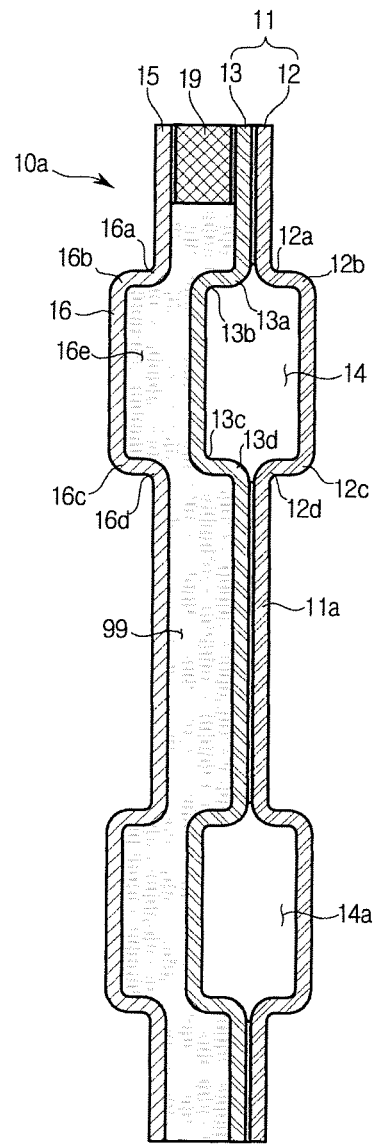

[Fig. 7]
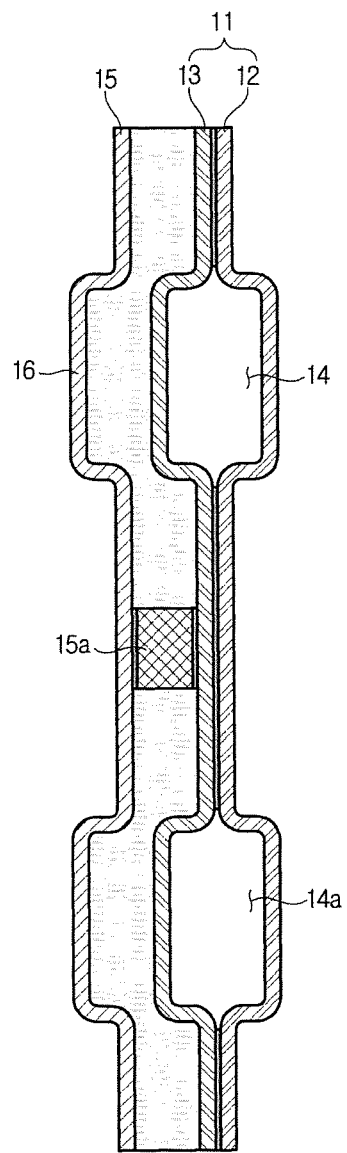

[Fig. 8]
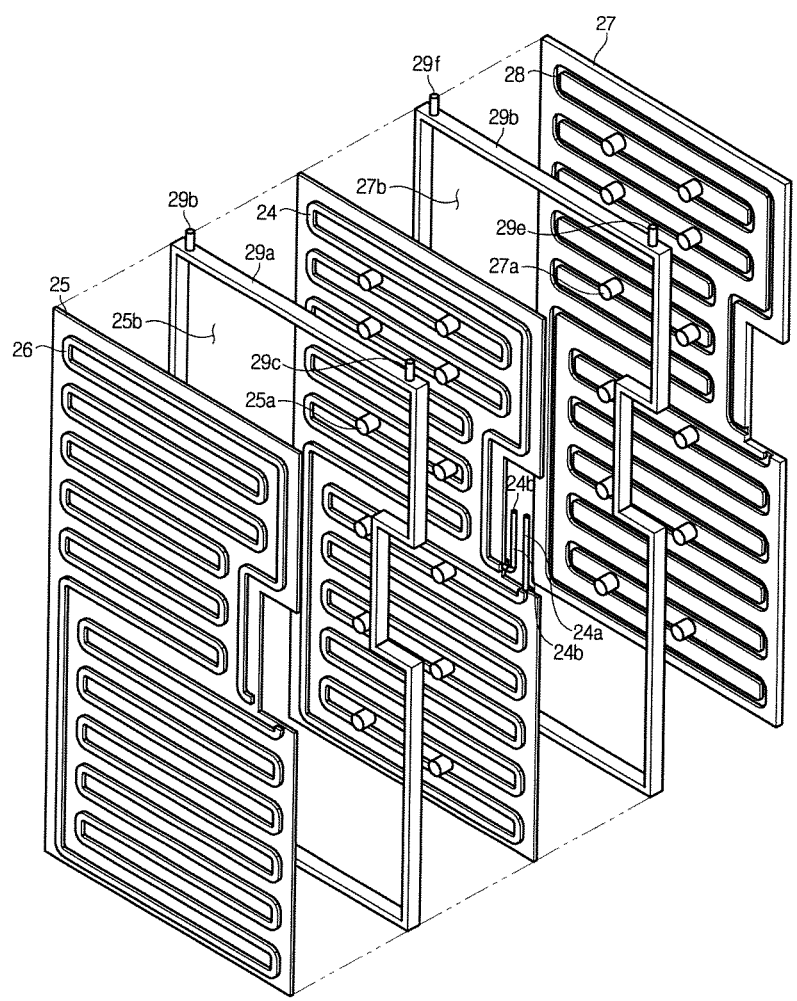

[Fig. 9]
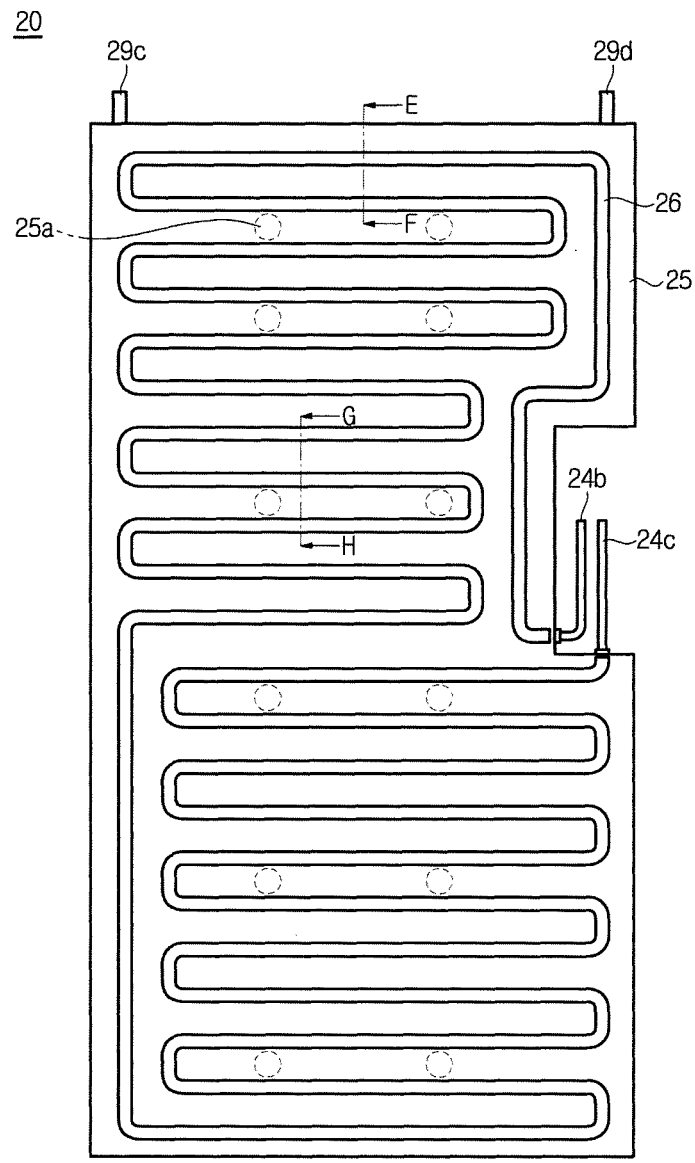
[Fig. 10]
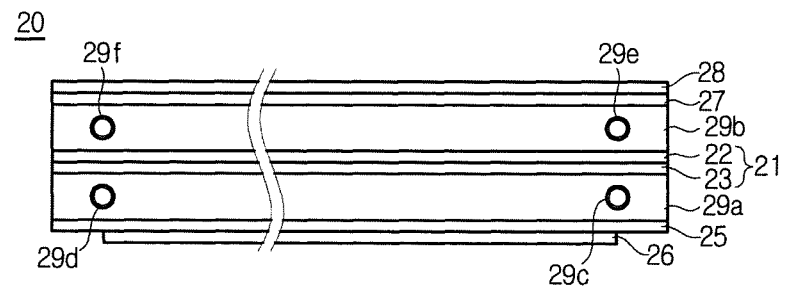

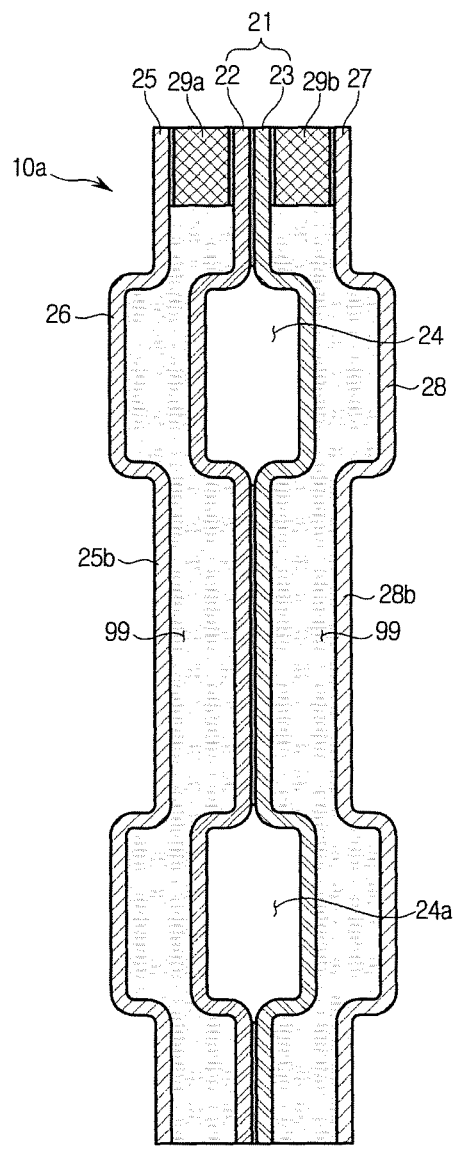
[Fig. 11]

[Fig. 12]
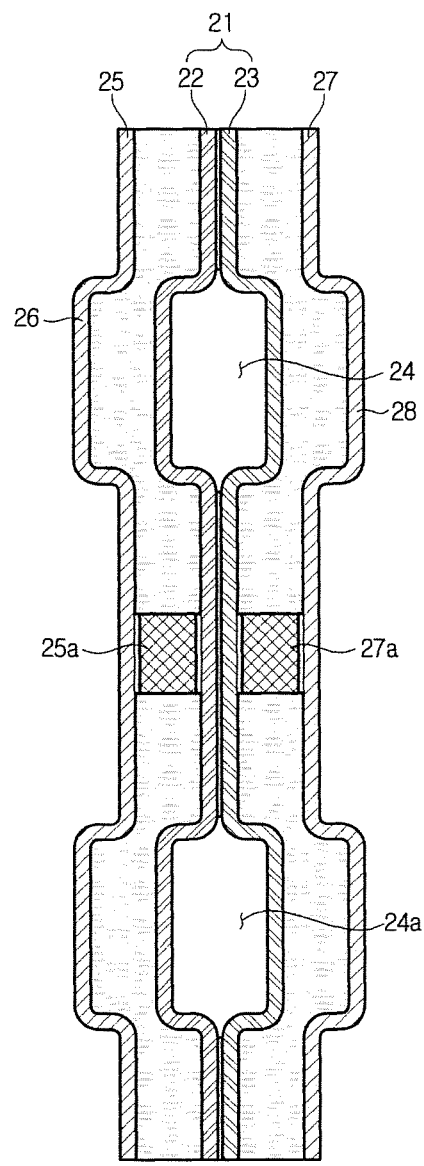

[Fig. 13]
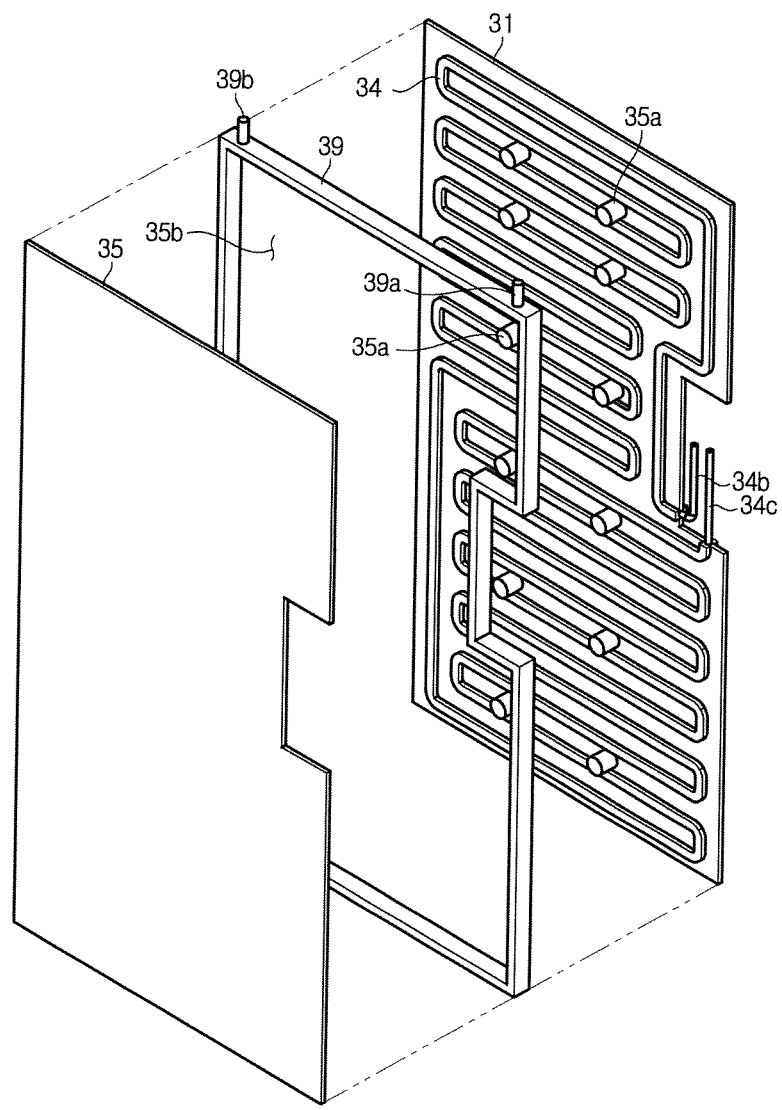

[Fig. 14]
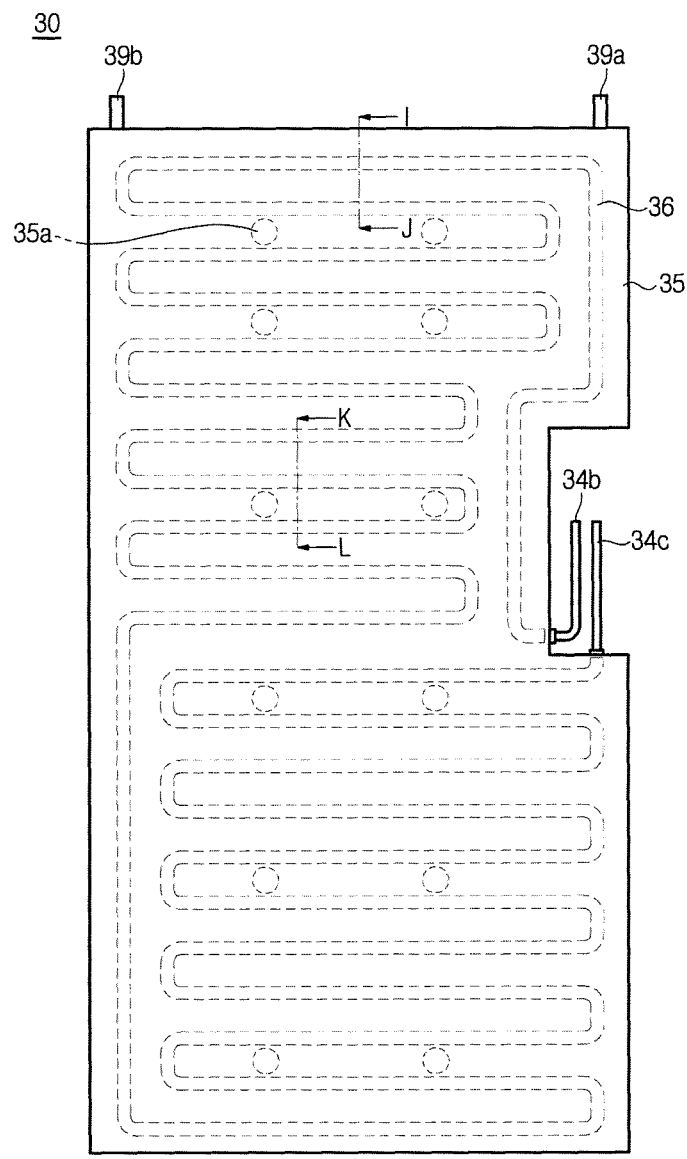
[Fig. 15]
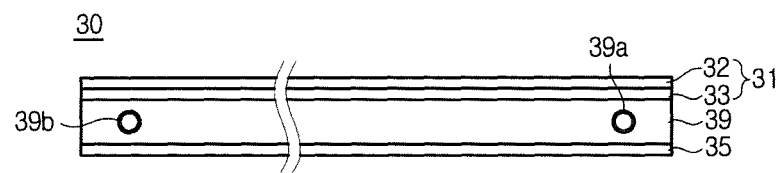

[Fig. 16]
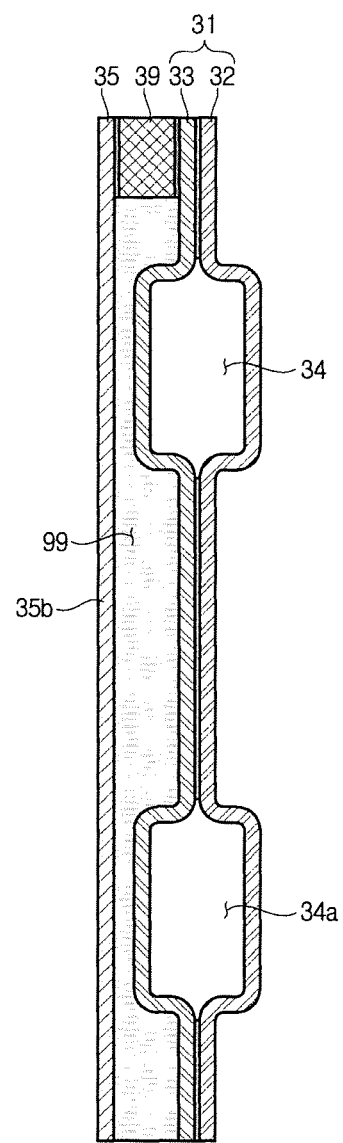

[Fig. 17]
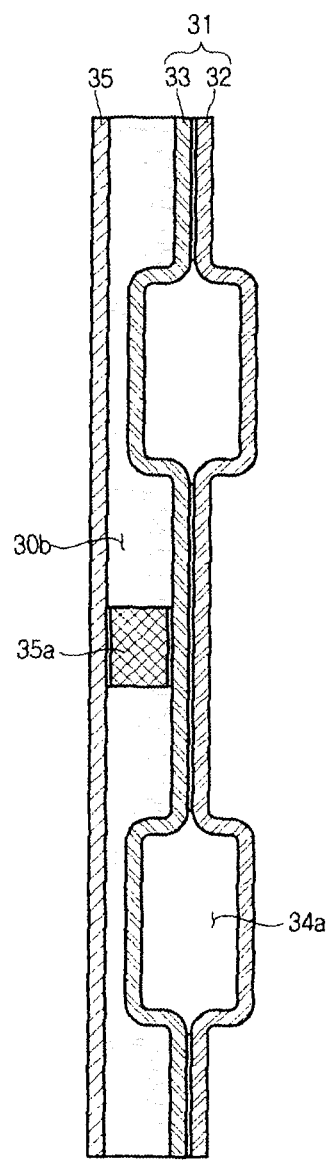

[Fig. 18]
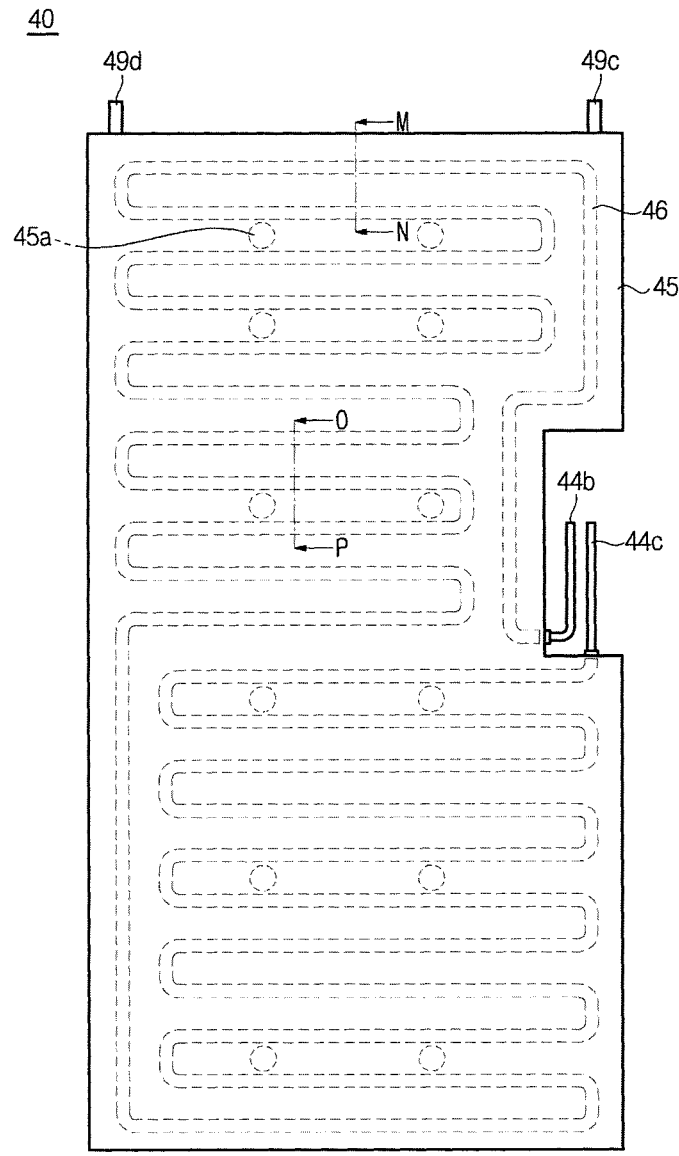
[Fig. 19]
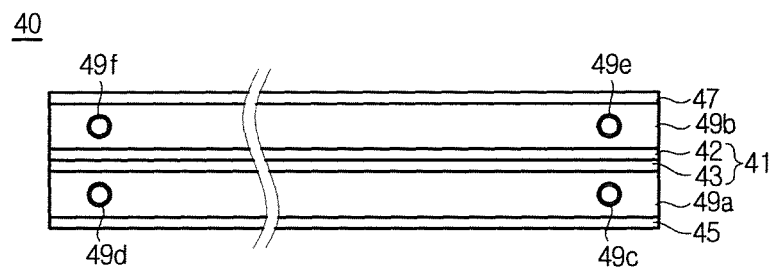

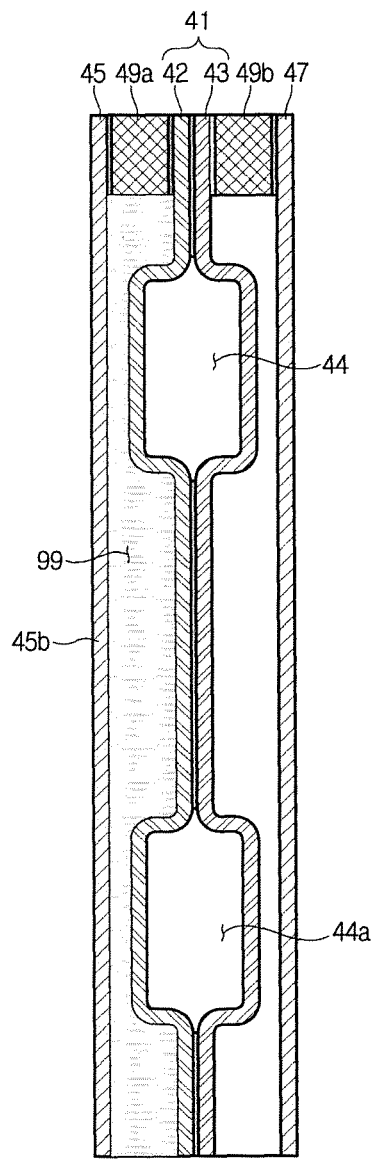
[Fig. 20]

[Fig. 21]
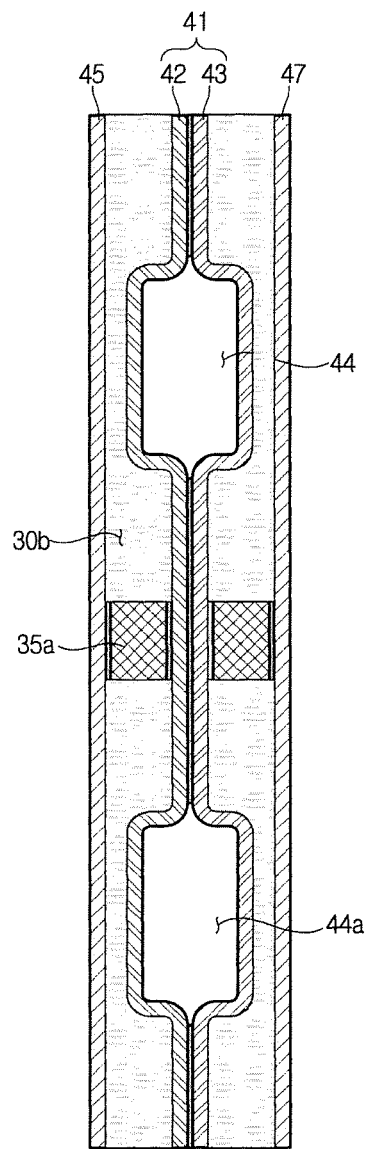

[Fig. 22]
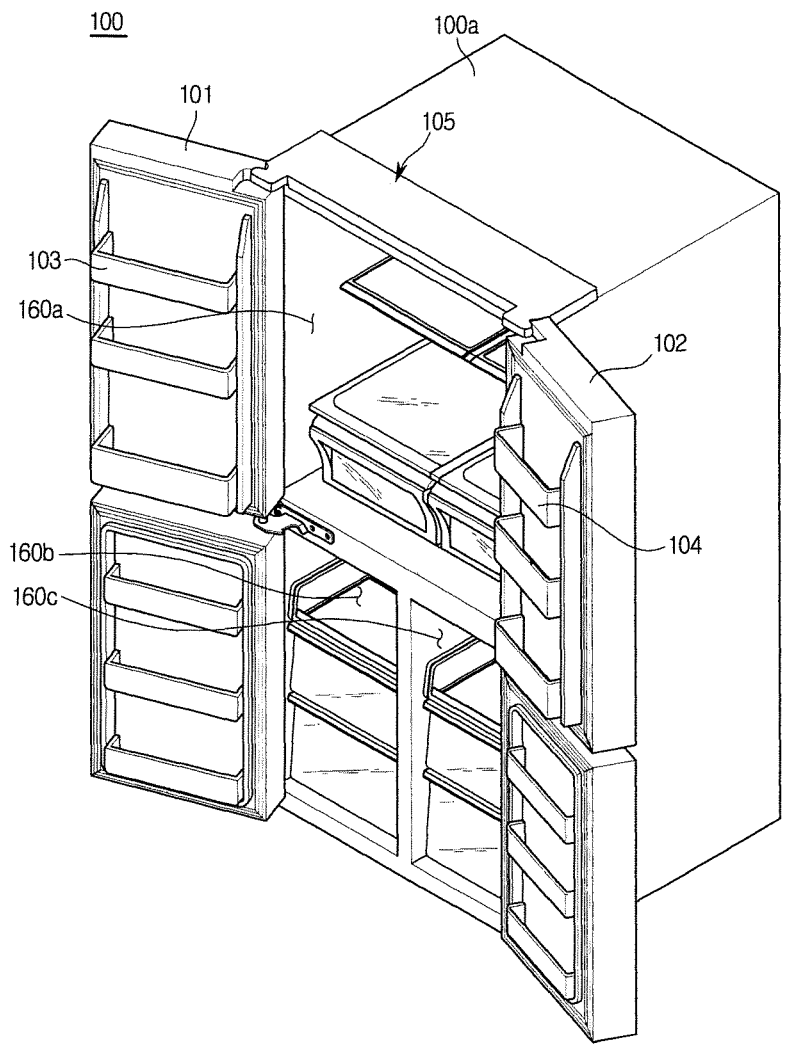
[Fig. 23]
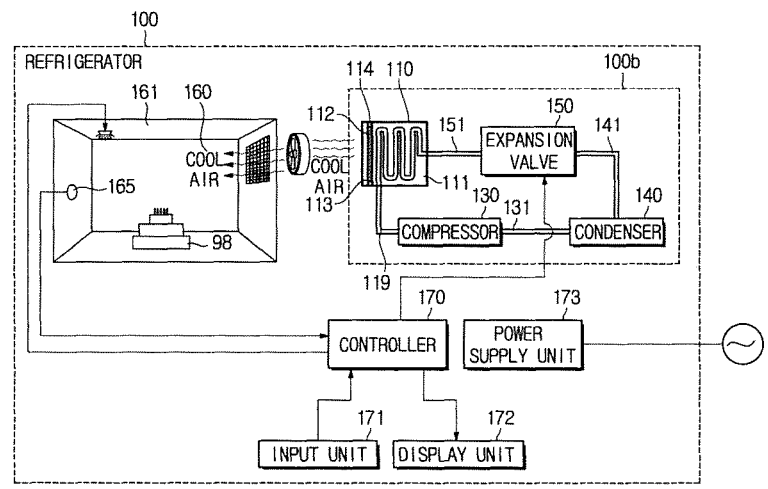

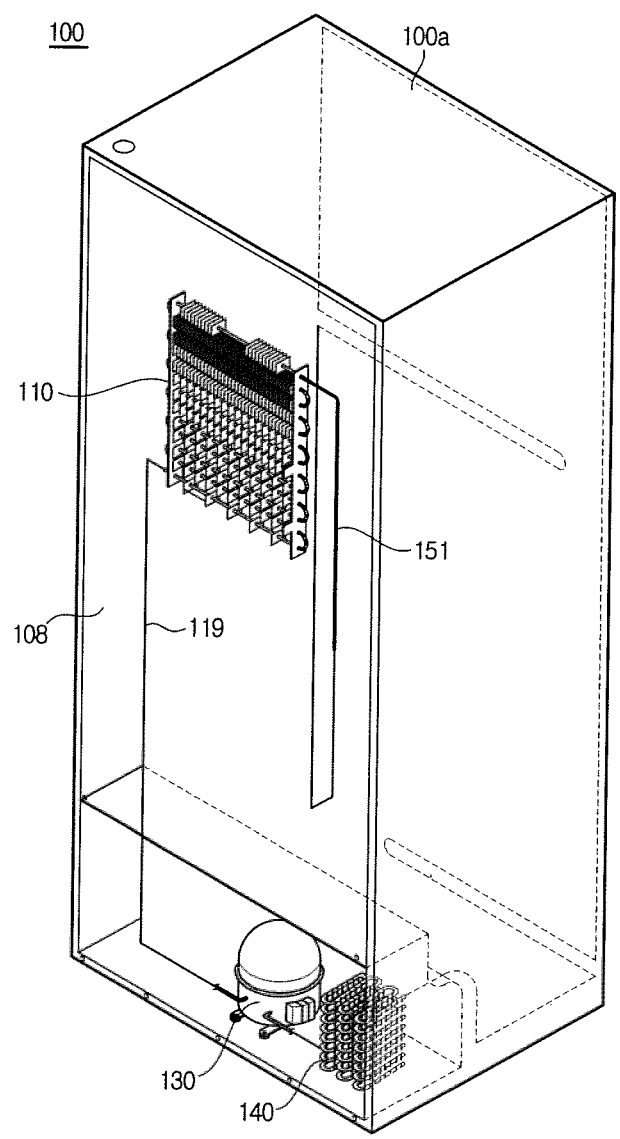
[Fig. 24]

[Fig. 25]
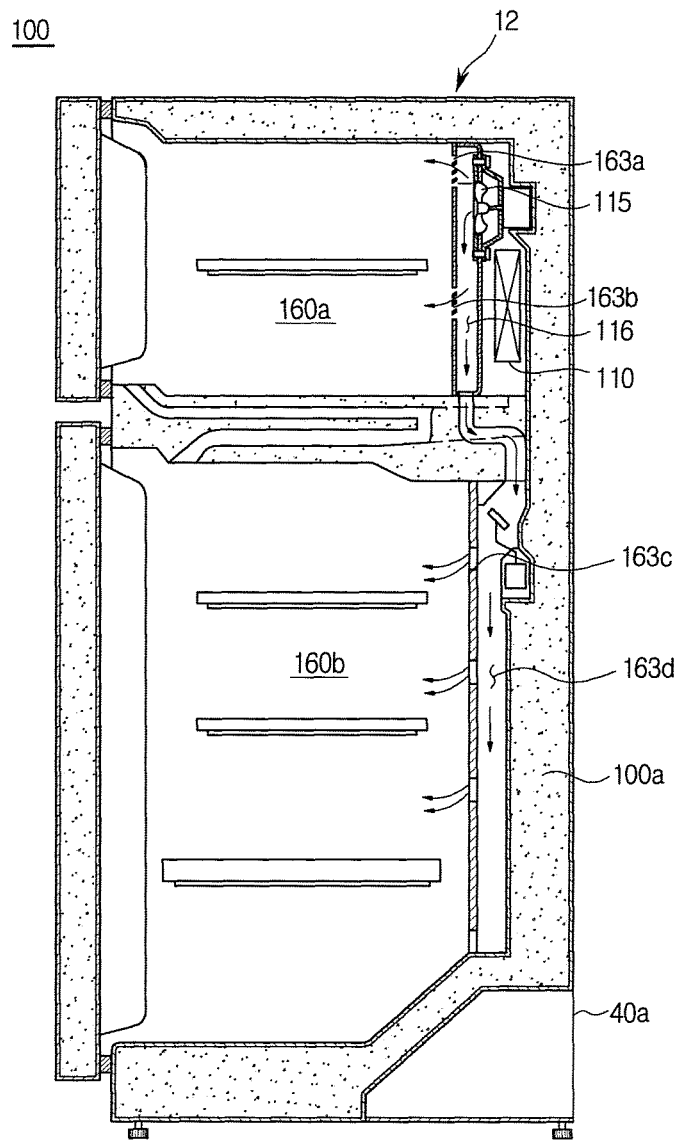

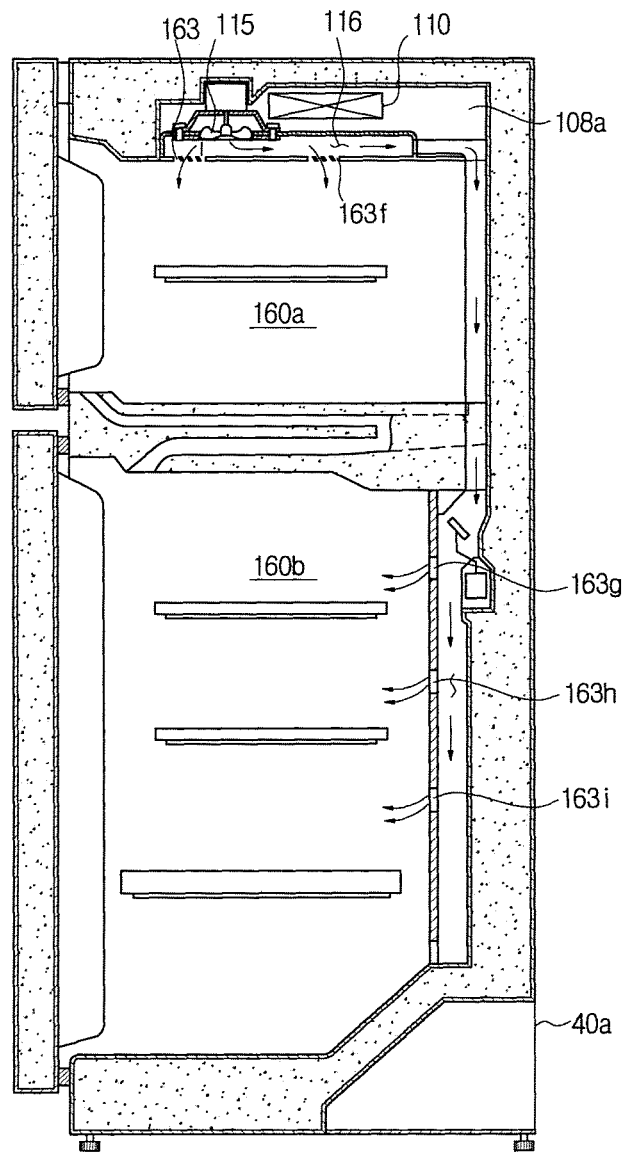
[Fig. 26]

[Fig. 27]
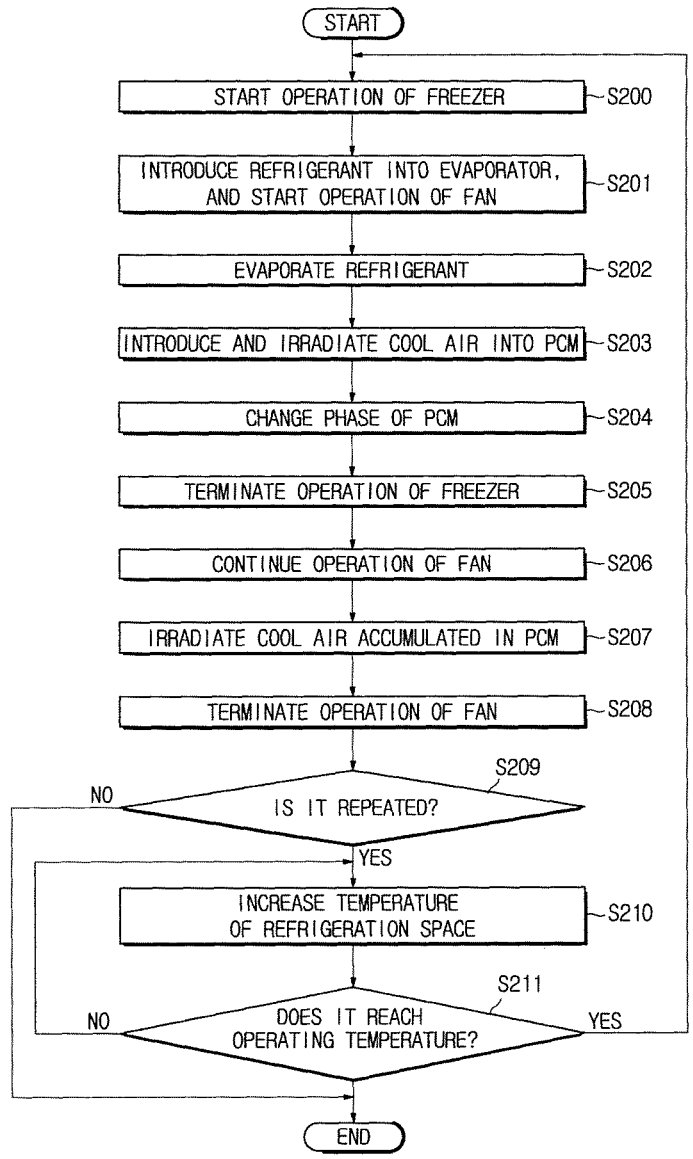
[Fig. 28]
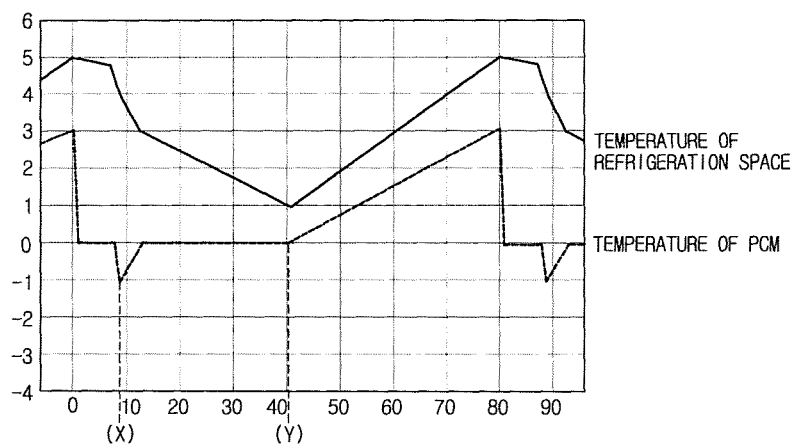

[Fig. 29]
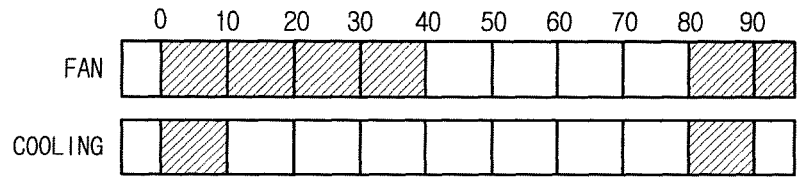
[Fig. 30]
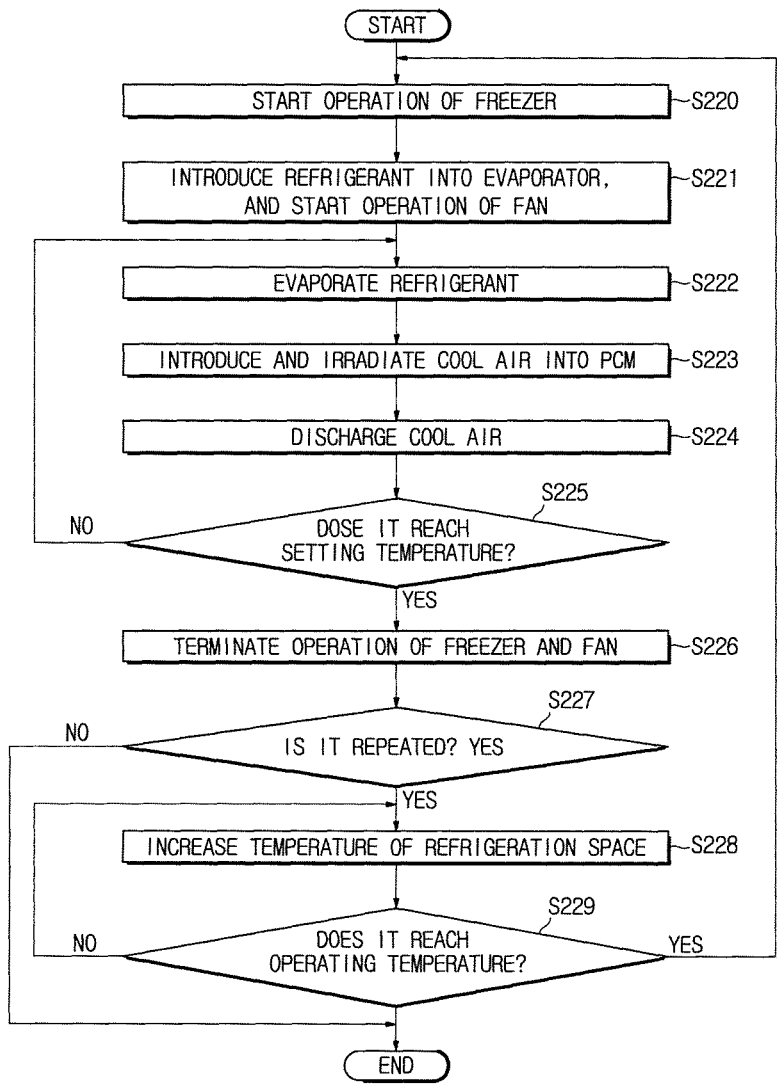

[Fig. 31]
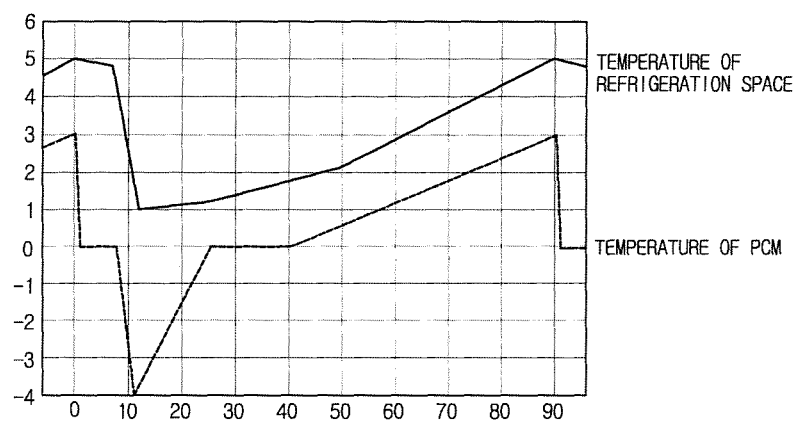
[Fig. 32]
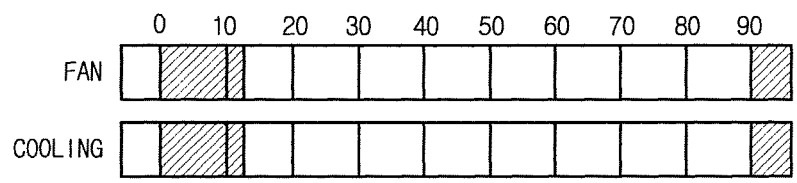

[Fig. 33]
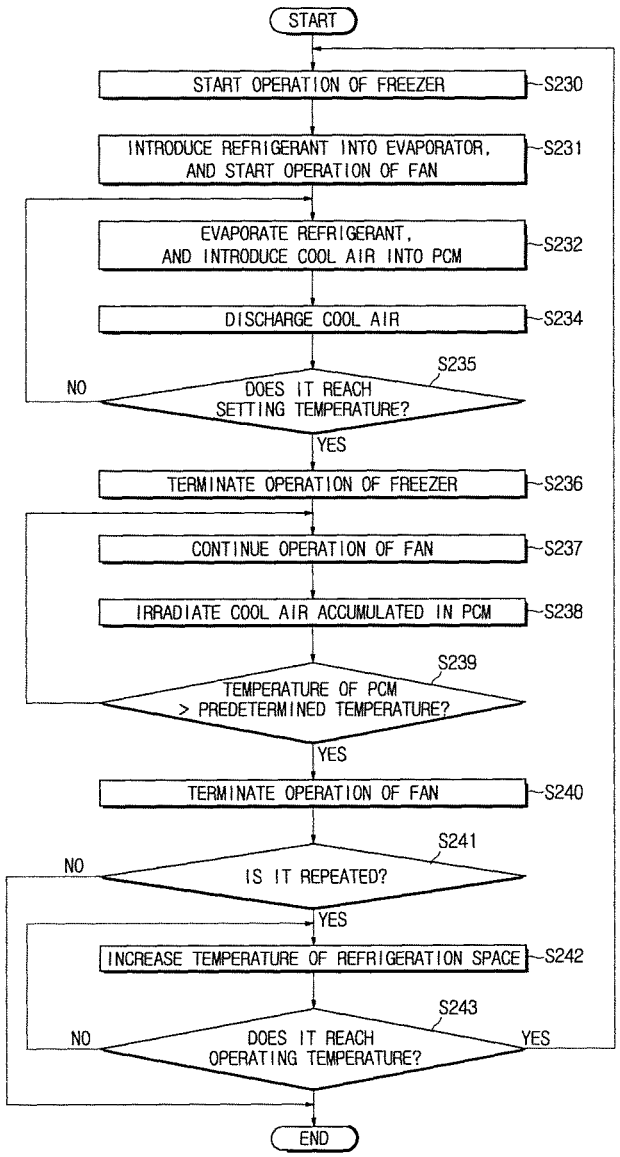
[Fig. 34]
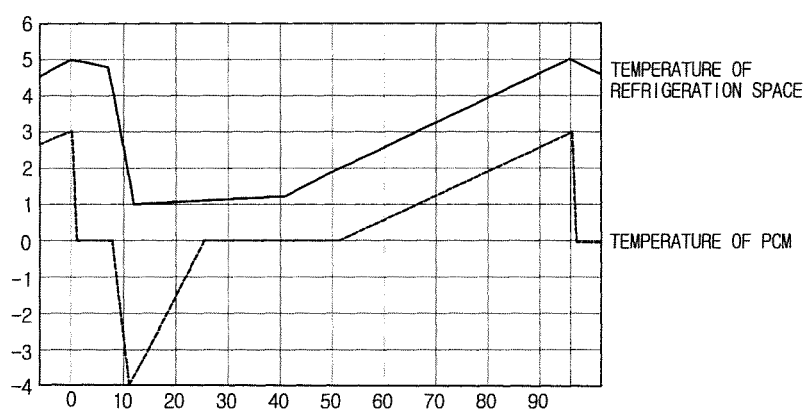

[Fig. 35]
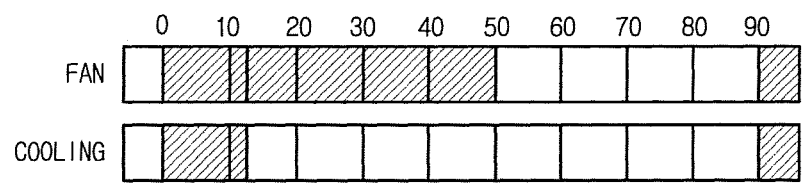

EVAPORATOR, A REFRIGERATOR USING THE EVAPORATOR AND A METHOD FOR CONTROLLING THE REFRIGERATOR

CROSS-REFERENCE TO RELATED APPLICATION(S)

The present application claims priority under 35 U.S.C. § 365 to International Patent Application No. PCT/KR2015/002636 filed Mar. 18, 2015, entitled "EVAPORATOR, REFRIGERATION DEVICE USING EVAPORATOR, AND REFRIGERATION DEVICE CONTROL METHOD", and, through International Patent Application No. PCT/KR2015/002636, to Korean Patent Application No. 10-2014-0119075 filed Sep. 5, 2014, each of which are incorporated herein by reference into the present disclosure as if fully set forth herein.

TECHNICAL FIELD

Embodiments of the present disclosure relate to an evaporator, a refrigerator using the evaporator, and a method for controlling the refrigerator.

BACKGROUND ART

A home appliance is a name collectively referring to various types of electronic products used in the home. Such a home appliance may include a refrigerator, a washing machine, a television, and the like. The home appliance may be equipped with a controller that controls various operations required for the home appliance, and perform necessary operations according to the control of the controller. A refrigerator is a device that can cool an object to be cooled which is placed in a refrigerating space, as a kind of the home appliance. Generally, the refrigerator can store foods, and the like that can be deteriorated at room temperature at a low temperature to provide a function to maintain the freshness of foods, and the like. The refrigerator can keep the refrigerating space at a low temperature by repeating evaporation and compression of a refrigerant. In this manner, an evaporator, a compressor, a condenser, an expansion valve, and the like may be provided in the refrigerator so that evaporation and compression of the refrigerant can be performed cyclically.

DISCLOSURE

Technical Problem

The present disclosure is directed to providing an evaporator which can cool a refrigerant quickly by increasing an evaporation temperature, a refrigerator using the evaporator, and a method for controlling the refrigerator.

The present disclosure is also directed to providing an evaporator which can additionally or supplementally cool any one of a refrigerating space and a freezing space using a phase change material, a refrigerator using the evaporator, and a method for controlling the refrigerator.

Technical Solution

To address the above-described problems, the present disclosure provides an evaporator, a refrigerator using the evaporator, and a method for controlling the refrigerator.

An evaporator may comprise a refrigerant evaporation unit in which a flow passage where a refrigerant evaporates is formed, a phase change material (PCM) accommodation unit that is installed in the refrigerant evaporation unit and accommodates a PCM and a protrusion that is provided in the PCM accommodation unit in correspondence with the flow passage, and protrudes outward to form an inner space, wherein the PCM is brought into direct contact with an outer surface of the refrigerant evaporation unit inside the PCM accommodation unit.

The PCM accommodation unit may be installed on at least one surface of a plurality of outer surfaces of the refrigerant evaporation unit.

The PCM accommodation unit may include an outer housing in which the protrusion is formed and an accommodation space that is provided inside the outer housing and accommodates the PCM.

The PCM accommodation unit may further include a side housing that is provided in a periphery of a boundary of the outer housing and the refrigerant evaporation unit and seals the accommodation space by coupling the outer housing and the refrigerant evaporation unit.

The PCM accommodation unit may further include an injection port that passes through the side housing to be connected to the accommodation space and through which the PCM injected into the accommodation space passes.

The PCM accommodation unit may further include an air discharge port that passes through the side housing to be connected to the accommodation space and through which air inside the accommodation space is discharged.

The evaporator may further comprise a coupling unit that is provided in the accommodation space, and couples and fixes the outer housing and the refrigerant evaporation unit.

The PCM is changed from a liquid state to a solid state at a temperature of 0 degrees Celsius or less.

A refrigerator may comprise a refrigeration space, a freezer that includes an evaporator for generating cool air supplied to the refrigeration space by circulating a refrigerant and a controller that controls an operation of the freezer, wherein the evaporator includes a refrigerant evaporation unit in which a flow passage where the refrigerant evaporates is formed, a PCM accommodation unit that is installed in the refrigerant evaporation unit and accommodates a PCM, and a protrusion that is provided in the PCM accommodation unit in correspondence with the flow passage and protrudes outward to form an inner space, and the PCM is brought into direct contact with an outer surface of the refrigerant evaporation unit inside the PCM accommodation unit.

The freezer further may include a compressor for compressing the refrigerant discharged from the evaporator, a condenser for condensing the refrigerant compressed in the compressor, and an expansion valve for injecting the condensed refrigerant into the evaporator.

The controller may be configured to operate the freezer until a phase of the PCM is changed, to operate the freezer until a temperature of the refrigeration space reaches a setting temperature, or to control the cool air to be supplied to the refrigeration space by operating the freezer when a temperature of the refrigeration space is higher than a predetermined operating temperature.

The refrigerator may further comprise a cooling fan that blows and supplies the cool air to the refrigeration space, and the controller may be configured to operate the cooling fan until a temperature of the refrigeration space reaches a setting temperature, to operate the cooling fan according to the operation of the freezer, or to operate the cooling fan even after the operation of the freezer is terminated.

The PCM may be brought into contact with the outer surface of the refrigerant evaporation unit inside the PCM accommodation unit.

A control method of a refrigerator which includes a freezer having a refrigeration space and an evaporator for generating cool air supplied to the refrigeration space, wherein the evaporator includes a refrigerant evaporation unit in which a flow passage where a refrigerant evaporates is formed, a PCM accommodation unit that is installed in the refrigerant evaporation unit and accommodates a PCM, and a protrusion that is provided in the PCM accommodation unit in correspondence with the flow passage and protrudes outward to form an inner space, and the PCM is brought into direct contact with an outer surface of the refrigerant evaporation unit inside the PCM accommodation unit, the control method may comprise introducing the refrigerant into the refrigerant evaporation unit of the evaporator and evaporating the refrigerant, changing a phase of the PCM accommodated in the PCM accommodation unit attached to the refrigerant evaporation unit according to latent heat absorbed by the refrigerant and operating the freezer up to a setting point of time.

The control method may further comprise starting the operation of the freezer when a temperature of the refrigeration space is higher than a predetermined temperature.

The control method may further comprise operating a cooling fan for blowing and supplying the cool air to the refrigeration space.

The control method may further comprise operating the cooling fan until a temperature of the refrigeration space reaches a setting temperature.

The control method may further comprise terminating the operation of the cooling fan when the operation of the freezer is terminated.

The control method may further comprise additionally operating the cooling fan even after the operation of the freezer is terminated.

The control method may further comprise terminating the operation of the cooling fan when a temperature of the PCM is higher than a predetermined temperature.

Advantageous Effects

According to the evaporator, the refrigerator using the evaporator, and the method for controlling the refrigerator which have been described above, the evaporation temperature of the refrigerant can be increased to quickly cool the refrigerant, thereby improving the efficiency of the cooling cycle.

Also, according to the evaporator, the refrigerator using the evaporator, and the method for controlling the refrigerator which have been described above, any one of the refrigerating space and the freezing space may be cooled using the cold energy accumulated in the phase change material.

Also, according to the evaporator, the refrigerator using the evaporator, and the method for controlling the refrigerator which have been described above, the refrigerating space or the freezing space may be cooled using the cold energy accumulated in the phase change material to reduce the operation rate of the compressor, thereby improving the overall energy efficiency of the refrigerator.

DESCRIPTION OF DRAWINGS

FIG. 1 is a view showing an embodiment of an evaporator.
FIG. 2 is a perspective view of a first embodiment of an evaporator.
FIG. 3 is a plan view of a first embodiment of an evaporator.
FIG. 4 is a bottom view of a first embodiment of an evaporator.
FIG. 5 is a rear view of a first embodiment of an evaporator.
FIG. 6 is a side cross-sectional view of a first embodiment of an evaporator.
FIG. 7 is a side cross-sectional view of a coupling unit of a first embodiment of an evaporator.
FIG. 8 is a perspective view of a second embodiment of an evaporator.
FIG. 9 is a plan view of a second embodiment of an evaporator.
FIG. 10 is a rear view of a second embodiment of an evaporator.
FIG. 11 is a side cross-sectional view of a second embodiment of an evaporator.
FIG. 12 is a side cross-sectional view of a coupling unit of a second embodiment of an evaporator.
FIG. 13 is an exploded perspective view of a third embodiment of an evaporator.
FIG. 14 is a plan view of a third embodiment of an evaporator.
FIG. 15 is a rear view of a third embodiment of an evaporator.
FIG. 16 is a side cross-sectional view of a part of a third embodiment of an evaporator.
FIG. 17 is a side cross-sectional view of a coupling unit of a third embodiment of an evaporator.
FIG. 18 is a plan view of a fourth embodiment of an evaporator.
FIG. 19 is a rear view of a fourth embodiment of an evaporator.
FIG. 20 is a side cross-sectional view of a fourth embodiment of an evaporator.
FIG. 21 is a side cross-sectional view of a coupling unit of a fourth embodiment of an evaporator.
FIG. 22 is a perspective view showing an appearance of an embodiment of a refrigerator.
FIG. 23 is a configuration view of an embodiment of a refrigerator.
FIG. 24 is a view showing a rear surface of a refrigerator.
FIG. 25 is a cross-sectional view according to an embodiment of a refrigerator.
FIG. 26 is a cross-sectional view according to another embodiment of a refrigerator.
FIG. 27 is a flowchart showing a first embodiment of a method for controlling a refrigerator.
FIG. 28 is a graph for explaining a first embodiment of a method for controlling a refrigerator.
FIG. 29 is a view for explaining a first embodiment of a method for controlling a refrigerator.
FIG. 30 is a flowchart showing a second embodiment of a method for controlling a refrigerator.
FIG. 31 is a graph for explaining a second embodiment of a method for controlling a refrigerator.
FIG. 32 is a view for explaining a second embodiment of a method for controlling a refrigerator.
FIG. 33 is a flowchart showing a third embodiment of a method for controlling a refrigerator.
FIG. 34 is a graph for explaining a third embodiment of a method for controlling a refrigerator.
FIG. 35 is a view for explaining a third embodiment of a method for controlling a refrigerator.

MODES OF THE INVENTION

Hereinafter, an embodiment of an evaporator will be described with reference to FIGS. 1 to 20.

FIG. 1 is a view showing an embodiment of an evaporator. As shown in FIG. 1, an evaporator 1 may include a refrigerant evaporation unit 2 in which a flow passage 3 is formed and a phase change material (PCM) accommodation unit 4 having an accommodation space 5 in which a PCM 6 is accommodated. A liquid refrigerant can flow in the flow passage 3 of the refrigerant evaporation unit 2 in a predetermined direction. As the refrigerant, ammonia, fluorinated hydrocarbons (Freon), an azeotropic mixed refrigerant, chloromethyl, or the like may be used. In addition, a variety of refrigerants that can be considered by those of ordinary skill in the art may be employed as the above-described refrigerant. The liquid refrigerant in the flow passage 3 may evaporate and become a gas. The refrigerant may evaporate and absorb latent heat of ambient air, so that cool air 7 to 9 can be transmitted to the ambient air to cool the ambient air.

The PCM accommodation unit 4 may be combined with the refrigerant evaporation unit 2. The PCM accommodation unit 4 may include the accommodation space 5 in which the PCM 6 is accommodated. The accommodation space 5 may be provided in direct contact with the refrigerant evaporation unit 2. For example, all or a part of one surface of the accommodation space 5 may be in contact with all or a part of an outer surface of the refrigerant evaporation unit 2. The PCM accommodated in the accommodation space 5 may be brought into direct contact with all or a part of the outer surface of the refrigerant evaporation unit 2 as long as the accommodation space 5 is brought into contact with the outer surface of the refrigerant evaporation unit 2. The PCM accommodation unit 4 may include an outer housing 4a that surrounds the accommodation space 5. The outer housing 4a may block the accommodation space 5 from the outside and prevent the PCM 6 from leaking to the outside. The outer housing 4a may be made of a metallic material capable of transmitting heat, and the metallic material may include, for example, steel, stainless steel (STS), aluminum, or the like.

The PCM 6 refers to a material whose phase is changed under specific conditions. The PCM 6 may include a material having a higher heat transfer coefficient compared to air. The PCM 6 may include a material whose phase is changed from liquid to solid at a temperature below 0 degrees Celsius. For example, the PCM 6 may include water, salt water, or the like. In addition, a variety of phase change materials that can be considered by those of ordinary skill in the art may be used as the PCM 6 accommodated in the PCM accommodation unit 4. The PCM 6 may flow or may not flow in the accommodation space 5.

The refrigerant in the flow passage 3 may directly discharge the cool air 7 to the outside while absorbing the surrounding latent heat. The refrigerant in the flow passage 3 may discharge cool air 8a and 8b in a direction of the PCM accommodation unit 4. In this case, the cool air 8a discharged from the flow passage 3 may be transmitted to the PCM 6 and accumulated, and then discharged to a direction of an arrow 9 by the PCM 6. In addition, the cool air 8b discharged from the flow passage 3 may be directly discharged to the outside through the PCM 6. When the PCM 6 has a significantly higher heat transfer coefficient than that of air, the cool air 8a generated by the refrigerant in the flow passage 3 may be quickly transmitted to the PCM 6. Accordingly, the evaporation temperature may be increased, and thereby the cooling efficiency of the evaporator 1 may be improved. In addition, since the PCM 6 of the PCM accommodation unit 4 may also discharge accumulated cool air 9, the evaporator 1 may supply the cool air 9 to the outside even when a refrigerant is not injected into the flow passage 3.

Hereinafter, a first embodiment of the above-described evaporator will be described with reference to FIGS. 2 to 8. FIG. 2 is a perspective view of a first embodiment of an evaporator, and FIG. 3 is a plan view of a first embodiment of an evaporator. FIG. 4 is a bottom view of a first embodiment of an evaporator, and FIG. 5 is a rear view of a first embodiment of an evaporator. FIG. 6 is a side cross-sectional view of a first embodiment of an evaporator. FIG. 6 is a side cross-sectional view cut along a line segment connecting (A) and (B) of FIG. 3.

As shown in FIGS. 2 to 6, an evaporator 10 according to a first embodiment may include a refrigerant evaporation unit 11 in which flow passages 14 and 14a with a refrigerant flowing therein are formed, and a PCM accommodation unit 10a that is attached to one surface of a plate of the refrigerant evaporation unit 11 and has a shape corresponding to a shape of the refrigerant evaporation unit 11.

The refrigerant evaporation unit 11 may have a generally flat plate shape. The flat plate may have a generally rectangular shape. However, the shape of the flat plate of the refrigerant evaporation unit 11 is not limited to the rectangular shape, and may have a circular shape or other polygonal shapes, as necessary. As shown in FIGS. 2 and 3, the flat plate of the refrigerant evaporation unit 11 may be provided with a portion where a part of a long side or a short side of a rectangle is bent inward to be concavely recessed. On the contrary, the flat plate of the refrigerant evaporation unit 11 may be provided with a portion where a part of a long side or a short side of a rectangle is bent outward to convexly protrude. According to embodiments, the refrigerant evaporation unit 11 may not have the recessed portion or the protruding portion.

As shown in FIG. 6, according to an embodiment, the refrigerant evaporation unit 11 may be formed by attaching two plates, for example, a first plate 12 and a second plate 13 to each other. Both the first plate 12 and the second plate 13 may be made of a metallic material such as iron, aluminum, or stainless steel. The first plate 12 and the second plate 13 can be attached by the adhesive force of an adhesive 11a or the like. The adhesive 11a may be selected according to the properties of the first plate 12 and the second plate 13. For example, when the first plate 12 and the second plate 13 are both made of metal, various adhesives for metals which can be considered by those of ordinary skill in the art may be used as the above-mentioned adhesive 11a. The adhesive 11a may be applied to all or most of regions in which the first plate 12 and the second plate 13 abut against each other, so that the first plate 12 and the second plate 13 can be bonded to each other. Accordingly, the refrigerant can be prevented from leaking to the outside from the flow passages 14 and 14a of the refrigerant generated by the first plate 12 and the second plate 13. According to the embodiments, the first plate 12 and the second plate 13 may be combined and attached by fasteners such as bolts, nuts, and the like.

The first plate 12 may have a generally planar shape, but may be provided with a first protrusion 12e that protrudes in a substantially normal direction of the flat plate in a part of the flat plate. According to an embodiment, the first protrusion 12e of the first plate 12 may have a shape that is bent (12a) at approximately 90 degrees in one direction, further bent (12b) at approximately 90 degrees in the opposite direction of one direction, still further bent (12c) at approximately 90 degrees in the opposite direction of one direction, and still further bent (12d) at approximately 90 degrees in one direction. In other words, the first protrusion 12e may have a shape of a square pillar as shown in FIGS. 2 to 6.

However, the shape of the first protrusion 12e is not limited thereto, and may have various shapes according to the embodiments. For example, the first protrusion 12e may have a semicircular pillar shape or a shape substantially similar to a semicircular pillar, or have other prism shapes. The first protrusion 12e may be formed by a groove provided in the mold of the first plate 12, or may be formed by a pressure applied to a surface of the first plate 12.

The second plate 13 may have a generally planar shape corresponding to the first plate 12. A second protrusion 13e that protrudes in a substantially normal direction of the plane may be provided in a part of the second plate 13. The position of the second protrusion 13e may be provided on the second plate 13 corresponding to the position of the first protrusion 12e. Specifically, the second protrusion 13e may be provided at a predetermined position of the second plate 13 so as to abut the first protrusion 12e of the first plate 12. According to an embodiment, the second protrusion 13e may have a shape that is bent (13a) at approximately 90 degrees in one direction, further bent (13b) at approximately 90 degrees in the opposite direction of one direction, still further bent (13c) at 90 degrees in the opposite direction of one direction, and still further bent (13d) at 90 degrees in one direction. Here, one direction in which the second plate 13 is bent (13a to 13d) may be a direction opposite to one direction in which the first plate 12 is bent (12a to 12d). Accordingly, the second protrusion 13e may have a shape of a square pillar as shown in FIGS. 2 to 6. However, the shape of the second protrusion 13e is not limited thereto, and may have various shapes according to the embodiments. For example, the second protrusion 13e may have a semicircular pillar shape or a shape substantially similar to a semicircular pillar, or have other prism shapes. In addition, the second protrusion 13e may have the same or similar shape as or to the shape of the first protrusion 12e, or have a shape different from that of the first protrusion 12e. The second protrusion 13e may be formed by a groove provided in the mold of the second plate 13, or may be formed by a pressure applied to a surface of the second plate 13.

The first plate 12 and the second plate 13 may have the same thickness or different thicknesses within a range selected by a designer. The thickness of the first plate 12 and the second plate 13 may be 1 mm or less. Such a thickness may be determined arbitrarily according to the designer's choice.

When the first plate 12 and the second plate 13 are brought into contact with each other, the first protrusion 12e of the first plate 12 and the second protrusion 13e of the second plate 13 come into contact with each other so that the flow passages 14 and 14a through which the refrigerant flows can be formed. Since the contact portion of the first plate 12 and the second plate 13 are adhered by an adhesive for metal or the like, the refrigerant flowing in the flow passages 14 and 14a may not leak to the outside.

Referring to FIG. 4, the flow passages 14 and 14a may be provided in the refrigerant evaporation unit 11 in a predetermined arrangement pattern. The protrusions 12e and 13e of the first plate 12 and the second plate 13 may be provided corresponding to the arrangement pattern of the flow passages 14 and 14a. The arrangement pattern of the flow passages 14 and 14a may be, for example, a zigzag pattern, as shown in FIG. 4. In addition, in manufacturing the evaporator 10, the flow passages 14 and 14a can be arranged in various arrangement patterns that can be considered by those of ordinary skill in the art. Both ends of the flow passages 14 and 14a may be exposed to the outside from an outer surface of the refrigerant evaporation unit 11. For example, the both ends of the flow passages 14 and 14a may be exposed to the outside at a portion of the refrigerant evaporation unit 11 which is recessed inward from the flat plate. A refrigerant injection port 14b for injecting the refrigerant into the flow passages 14 and 14a and a refrigerant discharge port 14c through which the refrigerant passing through the flow passages 14 and 14a is discharged may be provided at the both ends of the flow passages 14 and 14a exposed to the outside. When the evaporator 10 is installed in a refrigerator or an air conditioner, the refrigerant injection port 14b may be directly or indirectly connected to an expansion valve, and the refrigerant discharge port 14c may be directly or indirectly connected to a compressor. The refrigerant injection port 14b and the refrigerant discharge port 14c may include a pipe made of metal, rubber, synthetic resin, or the like.

Referring to FIGS. 2 and 3, the PCM accommodation unit 10a may be provided on one outer surface of the refrigerant evaporation unit 11. The PCM accommodation unit 10a may include an outer housing 15 and an accommodation space 15b isolated from the outside by the outer housing 15. The outer housing 15 may be made of a metallic material such as stainless steel, or the like. The outer housing 15 may be made of the same material as that of at least one of the first plate 12 and the second plate 13 of the refrigerant evaporation unit 11.

The outer housing 15 may be formed generally in the shape of a flat plate. In this case, the outer housing 15 may have a shape corresponding to the shape of the refrigerant evaporation unit 11. For example, when the refrigerant evaporation unit 11 has a rectangular shape as a whole, the outer housing 15 may likewise have a rectangular shape as a whole. In addition, as shown in FIG. 2, when the flat plate of the refrigerant evaporation unit 11 is formed with a portion where a part of a long side or a short side of a rectangle is bent inward to be concavely recessed, the outer housing 15 may be also formed with a portion where a part of a long side or a short side of a rectangle is bent inward to be concavely recessed.

The outer housing 15 may be formed generally in the shape of a flat plate, but an outer protrusion 16 that protrudes may be formed in some regions of the flat plate. The outer protrusion 16 may be provided corresponding to the protrusion 13e of the refrigerant evaporation unit 11. Specifically, the outer protrusion 16 may be formed at one position of the outer housing 15 corresponding to one position where the second protrusion 13e that protrudes from one surface of the refrigerant evaporation unit 11 to which the outer housing 15 is attached is arranged in the refrigerant evaporation unit 11. In other words, the outer protrusion 16 may be formed at one position of the outer housing 15 corresponding to one position where the flow passages 14 and 14a are provided in the refrigerant evaporation unit 11. Accordingly, the outer protrusion 16 may be provided on the outer housing 15 in a pattern that is the same as or substantially similar to the arrangement pattern of the flow passages 14 and 14a arranged on the outer surface of the refrigerant evaporation unit 11, as shown in FIG. 2. Of course, according to the embodiments, the outer protrusion 16 formed in some regions of the outer housing 15 may have the same pattern as that of the flow passages 14 and 14a, and the outer protrusion 16 formed in other some regions thereof may have a different pattern from that of the flow passages 14 and 14a. In addition, the outer protrusion 16 may be provided on the outer housing 15 in a pattern different from that of the flow passages 14 and 14a.

According to an embodiment, the outer protrusion 16 may have the same or a similar shape as or to the shape of the first protrusion 12e of the first plate 12 or the second protrusion 13e of the second plate 13. For example, according to an embodiment, the outer protrusion 16 of the outer housing 15 may have a shape that is bent (16a) at approximately 90 degrees in one direction, further bent (16b) at approximately 90 degrees in the opposite direction of one direction, still further bent (16c) at approximately 90 degrees in the opposite direction of one direction, and still further bent (16d) at approximately 90 degrees in one direction. In other words, the outer protrusion 16 may have a shape of a square pillar. Of course, according to the embodiments, the outer protrusion 16 may have a semicircular pillar shape or a shape substantially similar to a semicircular pillar, or have other prism shapes. The outer protrusion 16 may have a shape different from that of the first protrusion 12e of the first plate 12 or the second protrusion 13e of the second plate 13. As in the case of the first protrusion 12e of the first plate 12 or the second protrusion 13e of the second plate 13, the shape of the outer protrusion 16 is not limited to the above-mentioned square pillar, semicircular pillar shape, or prismatic shape, and the outer protrusion 16 may have various shapes that can be considered by those of ordinary skill in the art.

When the outer protrusion 16 is provided in the PCM accommodation unit 10a, a larger space 16e may be provided inside a portion where the outer protrusion 16 is provided, compared to when the outer protrusion 16 is absent. Accordingly, the PCM accommodation unit 10a may accommodate a larger amount of PCM 99 compared to when the outer protrusion 16 is absent, so that more cold energy generated such that the refrigerant in the refrigerant evaporation unit 11 absorbs latent heat can be accumulated.

The accommodation space 15b may be provided inside the outer housing 15 and accommodate the PCM 99. The accommodation space 15b may be formed by the outer housing 15 and the refrigerant evaporation unit 11. More specifically, the accommodation space 15b may be formed by an inner surface of the outer housing 15 and any one plate of the refrigerant evaporation unit 11, for example, by an outer surface of the second plate 13. Accordingly, the PCM 99 inside the accommodation space 15b may be brought into direct contact with the refrigerant evaporation unit 11. According to the embodiments, the accommodation space 15b may be formed by the outer housing 15, the refrigerant evaporation unit 11, and a side housing 19 connecting the outer housing 15 and the refrigerant evaporation unit 11.

The PCM 99 in the accommodation space 15b may be isolated from the outside by the outer housing 15, and brought into direct contact with the second plate 13 of the refrigerant evaporation unit 11. In this case, since the PCM 99 in the accommodation space 15b may be brought into direct contact even with the second protrusion 13e of the second plate 13, heat can be easily transferred to the flow passages 14 and 14a through which the refrigerant flows. Thus, the PCM 99 may be cooled by direct heat exchange with the refrigerant. Accordingly, cool air, which is cooling energy corresponding to the latent heat absorbed by the refrigerant, may be accumulated in the PCM 99. The cool air accumulated in the PCM 99 may be discharged to the outside. In addition, the refrigerant in the flow passages 14 and 14a may generate and deliver cool air while rapidly evaporating through direct heat exchange with the PCM 99. Thus, the evaporation efficiency of the refrigerant can be improved. The cool air generated by the refrigerant may be accumulated in the PCM 99, or discharged to the outside while passing through the PCM 99. When the PCM 99 has a higher heat transfer coefficient than air, the cool air can be delivered to the outside more quickly than when the PCM accommodation unit 10a is absent.

The PCM 99 in the accommodation space 15b may contain a material having a higher heat transfer coefficient than that of air. The PCM 99 may contain a material whose phase is changed from liquid to solid at a temperature below 0 degrees Celsius. The PCM 99 may flow or may not flow inside the accommodation space 15b. As the PCM 99 in the accommodation space 15b, various materials may be used which can be considered by those of ordinary skill in the art.

An appropriate amount of the PCM 99 may be injected into the accommodation space 15b so that the phase can be changed to a predetermined point of time. The predetermined point of time may be, for example, any point of time before a compressor of a refrigerator in which the evaporator 10 is to be installed ends an operation. In other words, an appropriate amount of the PCM 99 may be injected into the accommodation space 15b so that the phase of the PCM 99 can be changed before the compressor ends the operation.

The refrigerant evaporation unit 11 and the PCM accommodation unit 10a may be directly attached and bonded by a method such as rolling or welding. Further, the refrigerant evaporation unit 11 and the PCM accommodation unit 10a may be bonded by an adhesive for metal. The boundary to which the PCM accommodation unit 10a and the refrigerant evaporation unit 11 are adhered may be completely sealed to prevent the leakage of the PCM 99.

The refrigerant evaporation unit 11 and the PCM accommodation unit 10a may be coupled by the side housing 19. The side housing 19 may prevent leakage of the PCM 99 accommodated in the accommodation space 15b from the side to the outside. The side housing 19 may extend from the outer housing 15, or may be attached to the periphery of the boundary of the outer housing 15 and connected to the outer housing 15. The side housing 19 may be attached to the periphery of the boundary of the refrigerant evaporation unit 11 and connected to the refrigerant evaporation unit 11. Specifically, the side housing 19 may be attached to the periphery of the boundary of the second plate 13 of the refrigerant evaporation unit 11. A point where the side housing 19 and the refrigerant evaporation unit 11 are attached or a point where the outer housing 15 and the side housing 19 are attached may be completely sealed to prevent leakage of the PCM 99. The height of the side housing 19 may be arbitrarily selected by the designer depending on the amount of the PCM 99 to be injected into the accommodation space 15b. For example, the height of the side housing 19 may be any value between 1 mm and 4 mm. As the height of the side housing 19 is higher, the volume of the accommodation space 15b may be larger.

Referring to FIGS. 3 to 5, an injection port 19a for injecting the PCM 99 into the accommodation space 15b may be further provided at the boundary to which the PCM accommodation unit 10a and the refrigerant evaporation unit 11 are attached or the side housing 19. The injection port 19a may be connected to the accommodation space 15b. The injection port 19a may be sealed and removed when the injection of the PCM 99 is completed. The injection port 19a may have a shape of a pipe exposed to the outside for convenience of injection of the PCM 99. According to an embodiment, an air discharge port 19b that is connected to the accommodation space 15b for convenience of injection of the PCM 99 and discharges air inside the accommodation space 16b may be further provided at the boundary to which the PCM accommodation unit 10a and the refrigerant evaporation unit 11 are attached or the side housing 19. The air discharge port 19b may discharge the air present in the accommodation space 15b to the outside when the PCM 99 is injected into the accommodation space 15b, so that the PCM 99 may be rapidly and easily injected into the accommodation space 15b. The air discharge port 19b may have a shape of a pipe exposed to the outside. The air discharge port 19b may be sealed and removed when the injection of the PCM 99 is completed.

FIG. 7 is a side cross-sectional view of a coupling unit of a first embodiment of an evaporator. FIG. 7 is a side cross-sectional view cut along a line segment connecting (C) and (D) in FIG. 3. As shown in FIG. 7, a coupling unit 15a for coupling and fixing the outer housing 15 and the second plate 13 of the refrigerant evaporation unit 11 may be installed inside the accommodation space 15b. The coupling unit 15a may prevent the shape of the PCM accommodation portion 10a, for example, the shape of the outer housing 15 from being deformed according to the weight of the PCM 99. When a large amount of the PCM 99 is injected, the PCM 99 may exert a force on the outer housing 15, so that a part of the outer housing 15 may be bent and protruded unintentionally. The coupling unit 15a may provide a function of preventing a part of the outer housing 15 from being bent unintentionally. The coupling unit 15a may include a support for connecting the outer housing 15 to the second plate 13, and the support may be made of the same material as that of the outer housing 15, the first plate 12, or the second plate 13. According to the embodiments, the support may be made of a material that is harder than that of the outer housing 15, the first plate 12, or the second plate 13. The coupling unit 15a may be arranged between the flow passages 14 and 14a, as shown in FIG. 7. According to the embodiments, the evaporator 10 may include a plurality of coupling units 15a. The plurality of coupling units 15a may be arranged in a predetermined pattern. According to an embodiment, the coupling unit 15a may be arranged at a distal end portion of the evaporator 10 more than a central portion of the evaporator 10.

Hereinafter, a second embodiment of the above-described evaporator will be described with reference to FIGS. 8 to 12. FIG. 8 is a perspective view of a second embodiment of an evaporator, and FIG. 9 is a plan view of a second embodiment of an evaporator. FIG. 10 is a rear view of a second embodiment of an evaporator, and FIG. 11 is a side cross-sectional view of a second embodiment of an evaporator. FIG. 11 is a side cross-sectional view cut along a line segment connecting (E) and (F) in FIG. 9. In explaining a second embodiment of an evaporator with reference to FIGS. 8 to 11, description of the second embodiment of the evaporator, which is the same as the first embodiment or can be easily understood from the first embodiment, will be partially omitted for convenience of description.

As shown in FIGS. 8 to 11, an evaporator 20 according to a second embodiment may include a refrigerant evaporation unit 21 where flow passages 24 and 24a with a refrigerant flowing therein are formed, and a plurality of PCM accommodation units 20a and 20b respectively attached to both surfaces of a flat plate constituting the refrigerant evaporation unit 21. Each of the plurality of PCM accommodation units 20a and 20b may have an appearance corresponding to the appearance of the refrigerant evaporation unit 21 to which the PCM accommodation units 20a and 20b are attached.

The refrigerant evaporation unit 21 may have a generally flat plate shape, and in this case, the flat plate may have a generally rectangular shape. However, the shape of the refrigerant evaporation unit 11 is not limited thereto, and the refrigerant evaporation unit 11 may have various shapes, as necessary. The refrigerant evaporation unit 21 may include a portion where a part of a long side or a short side of the rectangular flat plate is bent inward to be concavely recessed. On the contrary, the refrigerant evaporation unit 21 may include a portion where a part of a long side or a short side of a rectangle is bent outward to convexly protrude. In this case, a refrigerant injection port 24b for injecting a refrigerant and a refrigerant discharge port 24c for discharging a refrigerant may be provided in the concavely recessed portion or the convexly protruding portion.

Referring to FIG. 11, the refrigerant evaporation unit 21 may be formed by attaching a third plate 22 and a fourth plate 23 to each other. Both the third plate 22 and the fourth plate 23 may be made of a metallic material such as iron, stainless steel, or aluminum. The thicknesses of the third plate 22 and the fourth plate 23 may be equal to each other, or there may be an approximate thickness difference therebetween within an error range selected by the designer. The third plate 22 and the fourth plate 23 may be attached by an adhesive force of an adhesive 21a or the like so that the refrigerant may be prevented from leaking to the outside in the flow passages 24 and 24a formed by the third plate 22 and the fourth plate 23. The adhesive 21a may be selected according to the properties of the third plate 22 and the fourth plate 23 as described above. According to the embodiments, the third plate 22 and the fourth plate 23 may be combined and attached by fasteners such as bolts, nuts, and the like.

The third plate 22 may be formed generally in the shape of a flat plate, and a third protrusion 22e may be provided in some regions of the third plate 22. The third protrusion 22e may have various shapes. For example, the third protrusion 22e may have a shape of a square pillar or a semicircular pillar. However, the shape of the third protrusion 22e is not limited thereto, and the third protrusion 22e may have various shapes according to the embodiments.

The fourth plate 23 may have a generally flat plate shape corresponding to the third plate 22. In addition, the fourth plate 23 may include a fourth protrusion 23e. The fourth protrusion 23e may protrude in some regions of the flat plate constituting the fourth plate 23 in a direction of a substantially normal line of the flat plate. The position of the fourth protrusion 23e may be provided corresponding to the position of the third protrusion 22e. In other words, the fourth protrusion 23e may be provided on the fourth plate 23 so as to abut the third protrusion 22e of the third plate 22, as shown in FIG. 11. The fourth protrusion 23e of the fourth plate 23 may have various shapes. For example, the fourth protrusion 23e of the fourth plate 23 may have a shape of a square pillar or a semicircular pillar. However, the shape of the fourth protrusion 23e is not limited thereto, and the fourth protrusion 23e may have various shapes according to the embodiments. The fourth protrusion 23e may have the same or a similar shape as or to the shape of the third protrusion 22e, or have a different shape from that of the third protrusion 22e.

When the third plate 22 and the fourth plate 23 are in contact with each other, the flow passages 24 and 24a may be formed by the third protrusion 22e and the fourth protrusion 23e. Referring to FIGS. 8 to 11, the flow passages 24 and 24a may be arranged in the refrigerant evaporation unit 21 in a predetermined arrangement pattern. The flow passages 24 and 24a may be provided in the refrigerant evaporation unit 21 in, for example, a zigzag pattern, as shown in FIGS. 4 and 8. In addition, the flow passages 24 and 24a may be arranged in various arrangement patterns that can be considered by those of ordinary skill in the art. Both ends of the flow passages 24 and 24a may be exposed to the outside from an outer surface of the refrigerant evaporation unit 21. For example, the both ends of the flow passages 24 and 24a may be exposed to the outside at a portion of the refrigerant evaporation unit 21 which is recessed inward. The refrigerant injection port 24b for injecting a refrigerant into the flow passages 24 and 24a and the refrigerant discharge port 24c for discharging the refrigerant passing through the flow passages 24 and 24a may be provided at the both ends of the flow passages 24 and 24a exposed to the outside. The refrigerant injection port 24b and the refrigerant discharge port 24c may include a pipe made of metal, rubber, synthetic resin, or the like.

Referring to FIGS. 8 to 11, a first PCM accommodation unit 20a may be installed on one outer surface of the refrigerant evaporation unit 21, and a second PCM accommodation unit 20b may be installed on the other outer surface of the refrigerant evaporation unit 21. The first PCM accommodation unit 20a may include a first outer housing 25 and a first accommodation space 25b provided inside the first outer housing 25. The first accommodation space 25b may be isolated from the outside by the first outer housing 25. In addition, the second PCM accommodation unit 20b may include a second outer housing 27 and a second accommodation space 27b provided inside the second outer housing 27, and the second accommodation space 27b may be isolated from the outside by the second outer housing 27. The first outer housing 25 and the second outer housing 27 may be made of a metallic material such as stainless steel. At least one of the first outer housing 25 and the second outer housing 27 may be manufactured using the same material as that of at least one of the third plate 22 and the fourth plate 23 of the refrigerant evaporation unit 21.

The first outer housing 25 and the second outer housing 27 may both have the same shape or may have different shapes from each other. The first outer housing 25 and the second outer housing 27 may have a shape of a flat plate corresponding to a shape of the refrigerant evaporation unit 21. For example, when the refrigerant evaporation unit 21 has a generally rectangular shape, the first outer housing 25 and the second outer housing 27 may also have a generally rectangular shape. When a part of the flat plate of the refrigerant evaporation unit 21 is concavely recessed as described above, a portion which is concavely recessed even on the first outer housing 25 and the second outer housing 27 may be present corresponding to the refrigerant evaporation unit 21.

A first outer protrusion 26 and a second outer protrusion 28 which protrude outwardly may be formed on a part of the first outer housing 25 and the second outer housing 27, respectively. The first outer protrusion 26 may be provided on the first outer housing 25 so as to correspond to the third protrusion 22e of the third plate 22 of the refrigerant evaporation unit 21. Specifically, the first outer protrusion 26 may be formed at one position of the first outer housing 25 corresponding to the position where the third protrusion 22e of the third plate 22 to which the first outer housing 25 is attached is arranged, and consequently, the first outer protrusion 26 may be formed at one position of the first outer housing 25 corresponding to one position where the flow passages 24 and 24a are provided in the refrigerant evaporation unit 21. Accordingly, the first outer protrusion 26 may be provided in the first outer housing 25 in the same or almost a similar pattern as or to the arrangement pattern of the flow passages 24 and 24a arranged on the outer surface of the refrigerant evaporation unit 21. The second outer protrusion 28 may be also formed at one position of the second outer housing 27 corresponding to the position where the fourth protrusion 23e of the fourth plate 23 is arranged in the same manner as the first outer protrusion 26, and consequently, the second outer protrusion 28 may be provided in the refrigerant evaporation unit 21 in correspondence with the flow passages 24 and 24a. Of course, according to the embodiments, the first outer protrusion 26 and the second outer protrusion 28 may be formed in a pattern different from that of the flow passages 24 and 24a. In addition, the first outer protrusion 26 and the second outer protrusion 28 have the same pattern in some regions, or have a different pattern from that of the flow passages 24 and 24a in other some regions.

The first outer protrusion 26 may have the same shape as that of the third protrusion 22e of the third plate 22. In addition, the second outer protrusion 28 may have the same or a similar shape as or to that of the fourth protrusion 23e of the fourth plate 23. For example, the first outer protrusion 26 and the second outer protrusion 28 may have a shape of a square pillar, a semicircular pillar, or a prism. However, the shapes of the first outer protrusion 26 and the second outer protrusion 28 may not be limited thereto. The first outer protrusion 26 and the second outer protrusion 28 may have various shapes depending on the needs of those of ordinary skill in the art.

The first accommodation space 25b and the second accommodation space 27b may accommodate the PCM 99 separately. The first accommodation space 25b may be provided inside the first outer housing 25. The first accommodation space 25b may be formed by the first outer housing 25 and the refrigerant evaporation unit 21. For example, the first accommodation space 25b may be formed by an inner surface of the first outer housing 25 and an outer surface of the third plate 22 of the refrigerant evaporation unit 21. The second accommodation space 27b may be provided inside the second outer housing 27. The second accommodation space 27b may also be formed by the second outer housing 27 and the refrigerant evaporation unit 21. For example, the second accommodation space 27b may be formed by an inner surface of the second outer housing 27 and an outer surface of the fourth plate 23 of the refrigerant evaporation unit 21. The PCM 99 in the first accommodation space 25b and the second accommodation space 27b may be brought into direct contact with the refrigerant evaporation unit 21, as described above. According to the embodiments, the first accommodation space 25b may be formed by the first outer housing 25, the refrigerant evaporation unit 21, and a first side housing 29a connecting the first outer housing 25 and the refrigerant evaporation unit 21, and the second accommodation space 27b may be formed by the second outer housing 27, the refrigerant evaporation unit 21, and a second side housing 29b connecting the second outer housing 27 and the refrigerant evaporation unit 21.

The PCM 99 accommodated in the first accommodation space 25b or the second accommodation space 27b may be brought into direct contact with the third plate 22 or the fourth plate 23 of the refrigerant evaporation unit 21. As described above, the PCM 99 in the first accommodation space 25b or the second accommodation space 27b may be brought into direct contact with the third protrusion 22e of the third plate 22 or the fourth protrusion 23e of the fourth plate 23. Accordingly, the PCM 99 may easily transfer heat to the flow passages 24 and 24a through which the refrigerant flows. In this case, since the refrigerant in the flow passages 24 and 24a can be directly heat-exchanged with the PCM 99 in both directions, the refrigerant may evaporate more rapidly than a case of the first embodiment, and transfer cool air to the PCM 99. Therefore, the evaporation efficiency of the refrigerant may be further improved. The cool air transferred to the PCM 99 may be accumulated in the PCM 99, or discharged to the outside through the PCM 99. When the PCM 99 has a higher heat transfer coefficient than air, the cool air may be delivered to the outside more quickly than in the case where the PCM accommodation units 20a and 20b are absent or are provided only on one surface.

As described above, the PCM 99 in the first accommodation space 25b or the second accommodation space 27b may contain a material having a higher heat transfer coefficient than that of the air, and contain a material whose phase is changed from liquid to solid at a temperature below 0 degrees Celsius.

An appropriate amount of the PCM 99 may be injected into the accommodation spaces 25b and 27b so that the phase can be changed to a predetermined point of time. Here, the predetermined point of time may be, for example, any point of time before a compressor of a refrigerator in which the evaporator 20 is to be installed ends an operation. In other words, an appropriate amount of the PCM 99 may be injected into the accommodation spaces 25b and 27b so that the phase of the PCM 99 can be changed before the compressor ends the operation.

The refrigerant evaporation unit 21 and the first PCM accommodation unit 20a or the refrigerant evaporation unit 21 and the second PCM accommodation unit 20b may be directly attached and bonded by a method such as rolling or welding, or may be bonded by an adhesive force of an adhesive for metal. In this case, the boundary to which the first PCM accommodation unit 20a and the refrigerant evaporation unit 21 are attached or the boundary to which the second PCM accommodation unit 20b and the refrigerant evaporation unit 21 are attached may be completely sealed to prevent the leakage of the PCM 99.

According to an embodiment, the refrigerant evaporation unit 21 and the first PCM accommodation unit 20a or the refrigerant evaporation unit 21 and the second PCM accommodation unit 20b may be coupled by the side housings 29a and 29b. The side housings 29a and 29b may prevent leakage of the PCM 99 accommodated in the first and second accommodation spaces 25b and 27b from the side to the outside. The side housings 29a and 29b may extend from the outer housings 25 and 27, or may be separately manufactured and then attached to the peripheries of the boundaries of the outer housings 25 and 27. In addition, the side housings 29a and 29b may be attached to the peripheries of the boundaries of the third plate 22 and the fourth plate 23 of the refrigerant evaporation unit 21. A point where the side housings 29a and 29b and the refrigerant evaporation unit 21 are attached or a point where the first PCM accommodation unit 20a or the second PCM accommodation unit 20b and the refrigerant evaporation unit 21 are attached may be completely sealed to prevent leakage of the PCM 99. The height of the side housings 29a and 29b may be arbitrarily selected by the designer depending on the amount of the PCM 99 to be injected into and accommodated in the first and second accommodation spaces 25b and 27b.

The coupling method of the refrigerant evaporation unit 21 and the first PCM accommodation unit 20a and the coupling method of the refrigerant evaporation unit 21 and the second PCM accommodation unit 20b may be the same or different. For example, the refrigerant evaporation unit 21 and the first PCM accommodation unit 20a are directly attached and coupled by a method such as rolling or welding, and the refrigerant evaporation unit 21 and the second PCM accommodation unit 20b may be coupled by the side housing 29b.

The boundary to which the first PCM accommodation unit 20a and the refrigerant evaporation unit 21 are attached, the boundary to which the second PCM accommodation unit 20b and the refrigerant evaporation unit 21 are attached, or the side housings 29a and 29b may be further provided with injection ports 29c and 29e for injecting the PCM 99 into the accommodation space 25b. According to an embodiment, the boundary to which the first PCM accommodation unit 20a and the refrigerant evaporation unit 21 are attached and the boundary to which the second PCM accommodation unit 20b and the refrigerant evaporation unit 21 are attached may be respectively provided with the separate injection ports 29c and 29e. Similarly, the first and second side housings 29a and 29b may be respectively provided with the separate injection ports 29c and 29e. According to the embodiments, the injection port 29c may be provided in any one PCM accommodation unit 20a, but the injection port 29e may not be provided in the other PCM accommodation unit 20b.

The injection ports 29c and 29e may be respectively connected to the corresponding accommodation spaces 25b and 27b. The injection ports 29c and 29e may be sealed and removed when the injection of the PCM 99 is completed. The injection ports 29c and 29e may have a shape of a pipe exposed to the outside for convenience of injection of the PCM 99. According to an embodiment, the boundary to which the first PCM accommodation unit 20a and the refrigerant evaporation unit 21 are attached, the boundary to which the second PCM accommodation unit 20b and the refrigerant evaporation unit 21 are attached, or the side housings 29a and 29b may be further provided with corresponding air discharge ports 29d and 29f for discharging air inside the accommodation spaces 25b and 27b in correspondence with the injection ports 29c and 29e. The air discharge ports 29d and 29f may have a shape of a pipe exposed to the outside. The air discharge ports 29d and 29f may be sealed and removed when the injection of the PCM 99 is completed.

FIG. 12 is a side cross-sectional view of a coupling unit of a second embodiment of an evaporator. FIG. 12 is a side cross-sectional view cut along a line segment connecting (G) and (H) in FIG. 9. As shown in FIG. 12, a first coupling unit 25a for coupling and fixing the first outer housing 25 and the third plate 22 may be installed in the first accommodation space 25b, and a second coupling unit 27a for coupling and fixing the second outer housing 27 and the fourth plate 23 may be installed in the second accommodation space 27b. The first coupling unit 25a or the second coupling unit 27a may prevent the shape of the first PCM accommodation unit 20a or the second PCM accommodation unit 20b from being deformed according to the weight of the PCM 99. The first coupling unit 25a or the second coupling unit 27a may include a support for connecting the first outer housing 25 and the third plate 22 or the second outer housing 27 and the fourth plate 23. The first coupling unit 25a or the second coupling unit 27a may be arranged between the flow passages 24 and 24a. The first coupling unit 25a may be arranged on the first outer housing 25 and the third plate 22 in a predetermined pattern. In addition, the second coupling unit 27a may be arranged on the second outer housing 27 and the fourth plate 23 in a predetermined pattern. The arrangement pattern of the first coupling unit 25a and the arrangement pattern of the second coupling unit 27a may be the same or different.

Hereinafter, a third embodiment of the above-described evaporator will be described with reference to FIGS. 13 to 17. FIG. 13 is an exploded perspective view of a third embodiment of an evaporator, FIG. 14 is a plan view of a third embodiment of an evaporator, and FIG. 15 is a rear view of a third embodiment of an evaporator. FIG. 16 is a side cross-sectional view of a part of a third embodiment of an evaporator. FIG. 16 is a side cross-sectional view cut along a line segment connecting (I) and (J) in FIG. 14. In explaining a third embodiment of an evaporator with reference to FIGS. 13 to 16, description of the third embodiment of the evaporator, which has been made by the above-described first and second embodiments, will be partially omitted.

As shown in FIGS. 13 to 16, an evaporator 30 according to a third embodiment may include a refrigerant evaporation unit 31 where flow passages 34 and 34a with a refrigerant flowing therein are formed, and a single PCM accommodation unit 30a attached to one surface of a flat plate constituting the refrigerant evaporation unit 31. The appearance of the PCM accommodation unit 30a may be formed corresponding to the appearance of the refrigerant evaporation unit 31 to which the PCM accommodation unit 30a is attached.

The refrigerant evaporation unit 31 may have a generally flat plate shape. For example, the refrigerant evaporation unit 31 may have a generally rectangular flat plate shape. However, the shape of the refrigerant evaporation unit 31 is not limited thereto, and the refrigerant evaporation unit 31 may have various shapes, as necessary. When the refrigerant evaporation unit 31 has a rectangular flat plate shape, the refrigerant evaporation unit 31 may include a portion where a part of a long side or a short side of the rectangle is bent inward to be concavely recessed, or conversely, have a portion where a part of a long side or a short side of the rectangle is bent outward to convexly protrude. A refrigerant injection port 34b for injecting a refrigerant and a refrigerant discharge port 34c for discharging a refrigerant may be provided in the concavely recessed portion or the convexly protruding portion.

Referring to FIG. 16, the refrigerant evaporation unit 31 may be formed by attaching a plurality of plates 32 and 33 to each other. The plurality of plates 32 and 33 may be made of a metal such as iron, stainless steel, or aluminum. The thicknesses of the plurality of plates 32 and 33 may be the same or different from each other. The plurality of plates 32 and 33 may be attached by an adhesive force of an adhesive 31a, or the like, so that the refrigerant does not leak to the outside from the flow passages 34 and 34a formed by the plurality of plates 32 and 33. The adhesive 31a may be selected according to the property of each of the plurality of plates 32 and 33. Of course, according to the embodiments, the plurality of plates 32 and 33 may be combined and attached by various kinds of fasteners such as bolts, nuts, and the like.

A fifth plate 32 of the plurality of plates 32 and 33 may have a generally planar shape, and a fifth protrusion 32e may be provided in some regions of the fifth plate 32. The fifth protrusion 32e may have various shapes such as a square pillar, a semicircular pillar, and the like. However, the shape of the fifth protrusion 32e is not limited thereto, and the fifth protrusion 32e may have various shapes, as necessary.

A sixth plate 33 of the plurality of plates 32 and 33 may have a shape corresponding to the shape of the fifth plate 32.

In other words, the sixth plate 33 may have a generally flat plate shape. A sixth protrusion 33e protruding in a direction of a substantially normal line of the sixth plate 33 may be provided in some regions of the sixth plate 33. The position where the sixth protrusion 33e is provided may correspond to the position of the fifth protrusion 32e. Therefore, the sixth protrusion 33e may abut the fifth protrusion 32e of the fifth plate 32 as shown in FIG. 15. The sixth protrusion 33e of the sixth plate 33 may also have a shape such as a square pillar or a semicircular pillar. However, the shape of the sixth protrusion 33e is not limited thereto, and according to the embodiments, the sixth protrusion 33e may have various shapes. The shape of the sixth protrusion 33e may be the same as or similar to or different from that of the fifth protrusion 32e.

As described above, the flow passages 34 and 34a through the refrigerant flows may be formed by the fifth protrusion 32e of the fifth plate 32 and the sixth protrusion 33e of the sixth plate 33. The flow passages 34 and 34a may be formed in the refrigerant evaporation unit 31 in a predetermined arrangement pattern. The flow passages 34 and 34a may be provided in the refrigerant evaporation unit 31 in, for example, a zigzag pattern. In addition, the flow passages 34 and 34a may be arranged in various arrangement patterns that can be considered by those of ordinary skill in the art. Both ends of the flow passages 34 and 34a may be exposed to the outside of the refrigerant evaporation unit 31 and connected to other devices. At the both ends of the flow passages 34 and 34a exposed to the outside, the refrigerant injection port 34b for injecting a refrigerant into the flow passages 34 and 34a and the refrigerant discharge port 34c for discharging the refrigerant passing through the flow passages 34 and 34a may be formed. The refrigerant injection port 34b and the refrigerant discharge port 34c may include pipes such as metal, rubber, or synthetic resin.

The PCM accommodation unit 30a may be provided on one outer surface of the refrigerant evaporation unit 31. The PCM accommodation unit 30a may include an outer housing 35 and an accommodation space 35b provided inside the outer housing 35. The accommodation space 35b may be isolated from the outside by the outer housing 35. The outer housing 35 may be made of a metallic material such as steel, aluminum, or stainless steel. The outer housing 35 may be made of the same material as that of at least one of the fifth plate 32 and the sixth plate 33 of the refrigerant evaporation unit 31.

The overall shape of the outer housing 35 may be formed corresponding to the overall shape of the refrigerant evaporation unit 31. For example, when the refrigerant evaporation unit 31 has a generally rectangular shape, the outer housing 35 may also have a generally rectangular shape. When a part of the refrigerant evaporation unit 31 is concavely recessed as described above, the outer housing 35 may also have a concavely recessed portion corresponding to the shape of the refrigerant evaporation unit 31.

According to the third embodiment of the evaporator 30, all the points of the surface exposed to the outside of the outer housing 35 may be formed generally flat. In other words, unlike the above-described first and second embodiments, the outer housing 35 may not have the protrusions 16, 26, and 28. All surfaces of the outer housing 35 exposed to the outside may be generally flat, so that cool air discharged through the flow passages 34 and 34a may quickly pass through the PCM 99 and be exposed to the air.

The accommodation space 35b may be provided inside the outer housing 35 and accommodate the PCM 99. The accommodation space 35b may be provided between the outer housing 35 and the refrigerant evaporation unit 31. Specifically, the accommodation space 35b may be formed by an inner surface of the outer housing 35 and an outer surface of the sixth plate 33 of the refrigerant evaporation unit 31. According to the embodiments, the accommodation space 35b may be formed by the outer housing 35, the refrigerant evaporation unit 31, and a side housing 39 connecting the outer housing 35 and the refrigerant evaporation unit 31.

The PCM 99 accommodated in the accommodation space 35b may be brought into direct contact with the sixth plate 33 of the refrigerant evaporation unit 31, as shown in FIG. 16. Therefore, the PCM 99 may directly contact a fourth protrusion 33e of the sixth plate 33. Accordingly, the refrigerant flowing through the flow passages 34 and 34a may easily transfer cool air to the PCM 99 while evaporating. The cool air transferred to the PCM 99 may be accumulated in the PCM 99, or discharged to the outside through the PCM 99. When the PCM 99 has a higher heat transfer coefficient than air, the cool air may be quickly delivered to the outside.

As described above, the PCM 99 accommodated in the accommodation space 35b may contain a material having a higher heat transfer coefficient than air. The PCM 99 may also contain a material whose phase is changed from liquid to solid at a temperature below 0 degrees Celsius.

An appropriate amount of the PCM 99 may be injected into the accommodation space 35b so that the phase can be changed to a predetermined point of time. The predetermined point of time may be, for example, any point of time before a compressor in which the evaporator 30 is to be installed ends an operation.

The refrigerant evaporation unit 31 and the PCM accommodation unit 30a may be directly coupled by a method such as rolling or welding, or coupled by an adhesive for metal or the like. The boundary to which the PCM accommodation unit 30a and the refrigerant evaporation unit 31 are attached may be completely sealed to prevent leakage of the PCM 99.

According to an embodiment, the refrigerant evaporation unit 31 and the PCM accommodation unit 30a may be coupled by the side housing 39. The side housing 39 may prevent the external leakage of the PCM 99 accommodated in the accommodation space 35b from the side. The side housing 39 may extend from the outer housing 35. In addition, the side housing 39 may be provided separately. The side housing 39 may be attached to the periphery of the boundary of the sixth plate 33 of the refrigerant evaporation unit 31 and the periphery of the boundary of the PCM accommodation unit 30a to connect the sixth plate 33 of the refrigerant evaporation unit 31 and the PCM accommodation unit 30a. A point to which the side housing 39 and the refrigerant evaporation unit 31 are attached and a point to which the side housing 39 and the PCM accommodation unit 30a are attached may be completely sealed. The height of the side housing 39 may be arbitrarily selected by the designer depending on the amount of PCM 99 to be injected and accommodated in the accommodation space 35b.

The boundary to which the PCM accommodation unit 30a and the refrigerant evaporation unit 31 are attached or the side housing 39 may be further provided with an injection port 39a for injecting the PCM 99 into the accommodation space 35b. The injection port 39a may be connected to the accommodation space 35b. The injection port 39a may be removed when the injection of the PCM 99 is completed. The boundary to which the PCM accommodation unit 30a and the refrigerant evaporation unit 31 are attached or the side housing 39 may be further provided with an air discharge port 39b for discharging the air inside the accommodation space 35b. The air discharge port 39b may be sealed and removed when the injection of the PCM 99 is completed.

FIG. 17 is a side cross-sectional view of a coupling unit of a third embodiment of an evaporator. FIG. 17 is a side cross-sectional view cut along a line segment connecting (K) and (L) of FIG. 14. As shown in FIG. 17, a coupling unit 35a for coupling and fixing the outer housing 35 and the sixth plate 33 may be installed in the accommodation space 35b. The coupling unit 35a may be disposed between the plurality of flow passages 34 and 34a. The coupling unit 35a may be disposed in the outer housing 35 and the sixth plate 33 in a predetermined pattern.

Hereinafter, a fourth embodiment of the above-described evaporator will be described with reference to FIGS. 18 to 21. FIG. 18 is a plan view of a fourth embodiment of an evaporator, FIG. 19 is a rear view of a fourth embodiment of an evaporator, and FIG. 20 is a side cross-sectional view of a fourth embodiment of an evaporator. FIG. 20 is a side cross-sectional view cut along a line segment connecting (M) and (N) of FIG. 18. In explaining a fourth embodiment of an evaporator with reference to FIGS. 18 to 20, description of the fourth embodiment of the evaporator, which is the same as the above-described first to third embodiments or can be easily understood therefrom, will be partially omitted for convenience of description.

As shown in FIGS. 18 to 21, an evaporator 40 according to a fourth embodiment may include a refrigerant evaporation unit 41 in which flow passages 44 and 44a with a refrigerant flowing therein are formed, and a single PCM accommodation unit 40a that is attached to one surface of a flat plate constituting the refrigerant evaporation unit 41. The appearance of the PCM accommodation unit 40a may be formed in the same manner in correspondence with the appearance of the refrigerant evaporation unit 41 to which the PCM accommodation unit 40a is attached.

The refrigerant evaporation unit 41 may have a generally flat plate shape. For example, the refrigerant evaporation unit 41 may have a generally rectangular flat plate shape. However, the shape of the refrigerant evaporation unit 41 is not limited thereto, and the refrigerant evaporation unit 41 may have various shapes, as necessary. The refrigerant evaporation unit 41 may include a portion where a part of a long side or a short side of the rectangle is bent inward to be concavely recessed, or conversely, have a portion where a part of a long side or a short side of the rectangle is bent outward to convexly protrude. A refrigerant injection port 44b and a refrigerant discharge port 44c may be provided in the concavely recessed portion or the convexly protruding portion.

According to an embodiment, the refrigerant evaporation unit 41 may be formed by attaching a plurality of plates 42 and 43 to each other. The plurality of plates 42 and 43 may be made of a metal such as iron, stainless steel, or aluminum. The thicknesses of the plurality of plates 42 and 43 may be the same or different from each other. The plurality of plates 42 and 43 may be attached by an adhesive 41a, or the like, so that the refrigerant does not leak to the outside from the flow passages 44 and 44a formed by the plurality of plates 42 and 43.

Each of the plurality of plates 42 and 43 may have a generally planar shape, and protrusions 42e and 43e may be provided in some regions of the plurality of plates 42 and 43. The protrusions 42e and 43e of the plates 42 and 43 may have the same shape or different shapes from each other. The protrusions 42e and 43e of the plates 42 and 43 may have various shapes such as a square pillar or a semicircular pillar, which can be considered by those of ordinary skill in the art.

The protrusion 42e of a seventh plate 42 and the protrusion 43e of an eighth plate 43 may be in contact with each other. As described above, the flow passages 44 and 44a through which a refrigerant flows may be formed by the protrusion 42e of the seventh plate 42 and the protrusion 43e of the eighth plate 43. The flow passages 44 and 44a may be formed in the refrigerant evaporation unit 41 in a predetermined arrangement pattern. For example, the flow passages 44 and 44a may be provided in the refrigerant evaporation unit 41 in a zigzag pattern. In addition, the flow passages 44 and 44a may be arranged in various arrangement patterns that can be considered by those of ordinary skill in the art. Both ends of the flow passages 44 and 44a may be exposed to the outside of the refrigerant evaporation unit 41 and connected to other devices. The refrigerant injection port 44b and the refrigerant discharge port 44c may be formed at the both ends of the flow passages 44 and 44a exposed to the outside. The refrigerant injection port 44b and the refrigerant discharge port 44c may include pipes such as metal, rubber, or synthetic resin.

A plurality of PCM accommodation units 40a and 40b may be provided on both surfaces of the refrigerant evaporation unit 41, and each of the PCM accommodation units 40a and 40b may include outer housings 45 and 47 and accommodation spaces 45b and 47b provided inside the outer housings 45 and 47. Each of the outer housings 45 and 47 may be made of a metallic material such as steel, aluminum, or stainless steel. The overall shape of the outer housings 45 and 47 may be formed corresponding to the overall shape of the refrigerant evaporation unit 41.

According to the evaporator 40 according to the fourth embodiment, all surfaces of the outer housings 45 and 47 exposed to the outside may be generally flat. In other words, unlike the above-described first and second embodiments, the protrusions 16, 26, and 28 may not be formed on the outer housings 45 and 47.

The accommodation spaces 45b and 47b may be provided inside the outer housings 45 and 47 and accommodate the PCM 99. The accommodation spaces 45b and 47b may be provided between the outer housings 45 and 47 and the refrigerant evaporation unit 41. The accommodation spaces 45b and 47b may be formed by inner surfaces of the outer housings 45 and 47 and an outer surface of the seventh plate 42 or the eighth plate 43 of the refrigerant evaporation unit 41, or formed by the outer housings 45 and 47, the refrigerant evaporation unit 41, and side housings 49a and 49b.

Since the PCM 99 accommodated in the accommodation spaces 45b and 47b is brought into direct contact with the outer surface of the seventh plate 42 or the eighth plate 43 of the refrigerant evaporation unit 41, the PCM 99 may be brought into direct contact into the protrusion 42e or 43e of the seventh plate 42 or the eighth plate 43. Accordingly, the refrigerant flowing in the flow passages 44 and 44a may easily transfer cool air to the PCM 99 while evaporating. The cool air transferred to the PCM 99 may be accumulated in the PCM 99 or discharged to the outside through the PCM 99. When the PCM 99 has a higher heat transfer coefficient than air, the cool air may be quickly delivered to the outside.

As described above, the PCM 99 accommodated in the accommodation spaces 45b and 47b may contain a material having a higher heat transfer coefficient than air. In addition, the PCM 99 may also contain a material whose phase is changed from liquid to solid at a temperature below 0 degrees Celsius.

An appropriate amount of the PCM 99 may be injected into the accommodation spaces 45b and 47b so that the phase can be changed to a predetermined point of time. Here, the predetermined point of time may include, for example, any point of time before a compressor in which the evaporator 40 is to be installed ends an operation.

The refrigerant evaporation unit 41 and the PCM accommodation units 40a and 40b may be directly coupled by a method such as rolling or welding, or coupled by an adhesive for metal, or the like. The boundary to which the PCM accommodation units 40a and 40b and the refrigerant evaporation unit 41 are attached may be completely sealed to prevent the leakage of the PCM 99.

The refrigerant evaporation unit 41 and the PCM accommodation units 40a and 40b may be coupled by the side housings 49a and 49b. The side housings 49a and 49b may extend from the outer housings 45 and 47 of the PCM accommodation units 40a and 40b, or separately provided. The side housings 49a and 49b may be attached to the periphery of the boundary of the seventh plate 42 of the refrigerant evaporation unit 41 and the periphery of the boundary of the outer housing 45, or attached to the periphery of the boundary of the eighth plate 43 of the refrigerant evaporation unit 41 and the periphery of the boundary of the outer housing 47. A point where the side housings 49a and 49b and the refrigerant evaporation unit 41 or the PCM accommodation units 40a and 40b may be completely sealed. The heights of the side housings 49a and 49b may be the same or different. The heights of the side housings 49a and 49b may be arbitrarily selected by the designer depending on the amount of PCM 99 to be injected and accommodated in the accommodation spaces 45b and 47b.

Injection ports 49c and 49e for injecting the PCM 99 into the accommodation spaces 45b and 47b may be further provided in the periphery of the boundary to which the refrigerant evaporation unit 41 and the PCM accommodation units 40a and 40b are attached or in the side housings 49a and 49b. The injection ports 49c and 49e may be provided in all the side housings 49a and 49b, or provided in the single side housing 49a or 49b. The injection ports 49c and 49e may be respectively connected to the accommodation spaces 45b and 47b. The injection ports 49c and 49e may be removed when the injection of the PCM 99 is completed. Air discharge ports 49d and 49f for discharging air inside the accommodation spaces 45b and 47b to the outside may be further provided in the periphery of the boundary to which the refrigerant evaporation unit 41 and the PCM accommodation units 40a and 40b are attached or the side housings 49a and 49b. The air discharge ports 49d and 49f may be provided in all the side housings 49a and 49b, or provided in the single side housing 49a or 49b. The air discharge ports 49d and 49f may be removed when the injection of the PCM 99 is completed.

FIG. 21 is a side cross-sectional view of a coupling unit of a fourth embodiment of an evaporator. FIG. 21 is a side cross-sectional view cut along a line segment connecting (O) and (P) of FIG. 18. Coupling units 45a and 47a for coupling the outer housings 45 and 47 and the refrigerant evaporation unit 41 may be respectively installed inside the accommodation spaces 45b and 47b. The coupling units 45a and 47a may be provided only in a single accommodation space of the accommodation spaces 45b and 47b, or provided in both of the accommodation spaces 45b and 47b. The coupling units 45a and 47a may be arranged between the plurality of flow passages 44 and 44a. The coupling units 45a and 47a may be arranged between the plurality of flow passages 44 and 44a in a predetermined pattern.

Hereinafter, a refrigerator will be described as an example of a device to which the above-described evaporators 1 and 10 to 40 are applied. However, the above-described evaporators 1 and 10 to 40 are not applicable only to the refrigerator which will be described later. The above-described evaporators 1 and 10 to 40 may be applied to various devices capable of cooling or freezing various objects to be cooled using obtained cool air after obtaining the cool air using a cooling cycle or the like. For example, the evaporators 1 and 10 to 40 of the above-described embodiments may be applied even to an air conditioner for cooling the indoor space by discharging the obtained cool air after obtaining the cool air using a cooling cycle or the like.

Hereinafter, an embodiment of a refrigerator will be described with reference to FIGS. 22 to 26. The refrigerator which will be hereinafter described may include not only a household refrigeration apparatus but also various kinds of industrial refrigeration apparatuses used in the medical field, the distribution field, the food service field, and the like.

FIG. 22 is a perspective view showing an appearance of an embodiment of a refrigerator. Referring to FIG. 22, a refrigerator 100 may include an outer housing 100a capable of housing various components and a door unit 105 provided at one side of the outer housing 100a. The door unit 105 may include one or two or more doors 101 and 102. The doors 101 and 102 may be installed in the outer housing 100a so as to be opened and closed by a hinge device provided between the outer housing 100a and the doors 101 and 102. The doors 101 and 102 may be provided with storage spaces 103 and 104, respectively. One or two or more refrigeration spaces 160 and 160a to 160c may be provided inside the outer housing 100a which can be exposed to the outside by the doors 101 and 102. The refrigeration spaces 160 and 160a to 160c described below can be understood as a concept including a freezing space. The one or two or more refrigeration spaces 160a to 160c may be realized by partitioning the internal space of the outer housing 100a using one or two or more panels.

FIG. 23 is a configuration view of an embodiment of a refrigerator, and FIG. 24 is a view showing a rear surface of a refrigerator. FIG. 25 is a cross-sectional view according to an embodiment of a refrigerator, and FIG. 26 is a cross-sectional view according to another embodiment of a refrigerator.

Referring to FIG. 23, the refrigerator 100 may include a freezer 100b, a cooling fan 115, the refrigeration space 160, and a controller 170 which are installed in the outer housing 100a. The freezer 100b may generate cool air according to a cooling cycle, and supply the generated cool air to the refrigeration space 160. The freezer 100b may include an evaporator 110, a compressor 130, a condenser 140, an expansion valve 150, and refrigerant passages 119, 121, 131, 141, and 151 for connecting them.

The evaporator 110 may include a refrigerant evaporation unit 111 in which a flow passage 111a is formed and a PCM accommodation unit 113 that accommodates a PCM 112. In the flow passage 111a, a refrigerant may discharge cool air while absorbing latent heat and evaporating. The PCM 112 of the PCM accommodation unit 113 may be cooled by absorbing the latent heat through the refrigerant while being brought into direct contact with the refrigerant evaporation unit 111, so that the phase of the PCM 112 may be changed. In this case, the PCM 112 may accumulate the discharged cool air. The cool air discharged from the flow passage 111a may be discharged through the PCM 112, or accumulated in the PCM 112 and then discharged by the PCM 112.

According to an embodiment, the evaporator 110 may be installed on a rear surface 108 of the refrigerator 100, as shown in FIGS. 24 and 25. The evaporator 110 may be installed on an inner surface of the outer housing 100a of the refrigerator 100 so that it may not be exposed to the outside. According to another embodiment, the evaporator 110 may be installed in an upper portion 108a of the refrigerator 100, as shown in FIG. 26.

As shown in FIGS. 23 to 26, the discharged cool air may be introduced into the refrigeration space 160 by being guided by the cooling fan 115. The cooling fan 115 may receive rotational power from a motor connected to a rotation shaft of the cooling fan 115 and be rotated according to the received rotational power to blow the cool air into the refrigeration space 160. The rotational speed of the cooling fan 115 may vary depending on the rotational speed of the motor. In this case, the rotational speed of the motor may be controlled to control the amount of the cool air introduced into the refrigeration space 160 and the delivery speed of the cool air. As the motor for rotating the cooling fan 115, various types of motors that can be considered by those of ordinary skill in the art can be employed.

The refrigeration space 160 may be surrounded by a plurality of external frames 161, and an object 98 may be accommodated in the refrigeration space 160. The accommodated object 98 may be cooled or frozen by cool air. The refrigeration space 160 may be provided with a cool air discharge port 163 through which cool air is introduced. The cool air introduced by the cooling fan 115 may be introduced into the refrigeration space 160 through the cool air discharge port 163. According to an embodiment, the refrigeration space 160 may include a light emitting means 164 for irradiating light to an inner space according to the control of the controller 170 or opening and closing operations of the doors 101 and 102. As the light emitting means 164, various types of illumination devices such as LED (light emitting diode) illumination may be used.

In the refrigeration space 160, a temperature detection sensor 165 for measuring a temperature inside the refrigeration space 160 may be installed. The temperature detection sensor 165 may output and transmit an electrical signal to the controller 170 according to the temperature inside the refrigeration space 160. Accordingly, the controller 170 may control the cooling cycle implemented by the evaporator 110, the compressor 130, the condenser 140, the expansion valve 150, and the like according to the temperature inside the refrigeration space 160.

Referring to FIGS. 25 and 26, the cool air discharged from the evaporator 110 may be discharged to a first refrigeration space 160a through one or two or more cool air discharge ports 163a, 163b, 163e, and 163f while being moved through a cool air passage 116. In this case, the cool air passage 116 may extend to a second refrigeration passage 160b, and the cool air discharged from the evaporator 110 may be introduced into a second refrigeration space 163d through the cool air passage 116 and cool air discharge ports 163c, 163g, 163h, and 163i provided in the second refrigeration passage 163d.

As shown in FIGS. 23 and 24, a refrigerant evaporated while passing through the flow passage 111a of the evaporator 110 may be transmitted to the compressor 130 through a refrigerant passage 119. The refrigerant passage may have a shape of a tube. The compressor 130 may convert the evaporated refrigerant into a high-temperature and high-pressure gas. To this end, the compressor 130 may include a motor. The compressor 130 may be operated according to the control of the controller 170. The high-temperature and high-pressure gas may be transmitted to the condenser 140 through a refrigerant passage 131 connected to the compressor. The compressor 130 may be installed on the rear surface 108 of the refrigerator 100.

The condenser 140 may liquefy the refrigerant into a high-temperature and high-pressure liquid, and the refrigerant may liquefy and discharge heat to the outside. Around the condenser 140, a fan for dispersing the heat discharged according to the liquefaction of the refrigerant may be provided. The refrigerant condensed in the condenser 140 may be transmitted to the expansion valve 150 through a refrigerant passage 141. The condenser 140 may be installed on the rear surface 108 of the refrigerator 100.

The expansion valve 150 may regulate an amount of the refrigerant introduced into the evaporator 110 while lowering the pressure and temperature of the refrigerant. The expansion valve 150 may control the amount of the refrigerant introduced into the evaporator 110 according to a control signal of the controller 170. The refrigerant discharged from the expansion valve 150 may be introduced again into the evaporator 110 through a refrigerant passage 151.

The controller 170 may control the overall operation of the refrigerator 100. The controller 170 may control the cooling cycle by transmitting a control signal to the compressor 130, the expansion valve 150 or the like, thereby controlling the temperature inside the refrigeration space 160. The controller 170 may control the cooling cycle according to the temperature inside the refrigeration space 160 by generating a control signal related to the cooling cycle based on an electrical signal transmitted from the temperature detection sensor 165. In addition, the controller 170 may also control the operation of the cooling fan 115 by transmitting a control signal to the motor connected to the cooling fan 115.

According to an embodiment, the controller 170 may generate a control signal for controlling the operation of the freezer 100*b*, so that the freezer 100*b* may operate until the phase of the PCM 112 is changed. For example, when the PCM 112 is water, the controller 170 may control the freezer 100*b* to operate until the water solidifies. In this case, a separate detection means for detecting a state of the PCM 112 may be provided outside the PCM accommodation unit 113, as necessary. Here, the state of the PCM 112 may include the phase of the PCM 112, the temperature or volume of the PCM 112, and the like. The separate detection means for detecting the state of the PCM 112 may include a temperature sensor. Of course, the controller 170 may estimate the state of the PCM 112 through an arithmetic process, and control the operation of the freezer 100*b* according to the estimation result.

According to another embodiment, the controller 170 may control the operation of the freezer 100*b* according to the temperature inside the refrigeration space 160.

Specifically, the controller 170 may generate a control signal to operate the freezer 100*b* until the temperature inside the refrigeration space 160 reaches a setting temperature. In this case, the controller 170 may determine whether the temperature inside the refrigeration space 160 has reached the setting temperature according to the electrical signal transmitted from the temperature detection sensor 165. The setting temperature may be predetermined by the designer of the refrigerator 100, or may be predetermined by a user. The setting temperature may be changed, as necessary.

In addition, when the temperature inside the refrigeration space 160 is higher than a predetermined operating temperature, the controller 170 may generate a control signal to operate the freezer 100*b* whose operation is stopped, and transmit the generated control signal to the freezer 100*b*. In this case, the controller 170 may determine whether the temperature inside the refrigeration space 160 is higher than the operating temperature according to the electrical signal transmitted from the temperature detection sensor 165. The operating temperature may be predetermined by the designer of the refrigerator 100, or may be predetermined by the user. The operating temperature may also be changed, as necessary.

The controller 170 may determine whether the cooling fan 115 operates according to the operation of the freezer 100*b*, and control the operation of the cooling fan 115 according to the determination result. For example, the controller 170 may control the operation of the cooling fan 115 to be terminated when the operation of the freezer 100*b* is terminated. According to the embodiments, the controller 170 may control the cooling fan 115 so that the cooling fan 115 may continue to operate even if the freezer 100*b* ends its operation.

In addition, the controller 170 may determine whether the cooling fan 115 operates according to the temperature inside the refrigeration space 160, and control the operation of the cooling fan 115 according to the determination result. For example, the controller 170 may determine whether the internal temperature of the refrigeration space 160 reaches a setting temperature, and control the cooling fan 115 to terminate its operation when the internal temperature of the refrigeration space 160 reaches the setting temperature. According to the embodiments, the controller 170 may control the cooling fan 115 so that the cooling fan 115 may operate even after the internal temperature of the refrigeration space 160 reaches the setting temperature.

In addition, the controller 170 may determine whether the cooling fan 115 operates according to the state of the PCM, and control the operation of the cooling fan 115 according to the determination result. For example, the controller 170 may control to terminate the operation of the cooling fan 115 when the temperature of the PCM 112 is higher than a predetermined temperature, or control the cooling fan 115 to be operated when the temperature of the PCM 112 is lower than the predetermined temperature. The state of the PCM 112 may include the phase of the PCM 112, the temperature or volume of the PCM 112, and the like.

The controller 170 may be implemented using one or two or more semiconductor chips and a substrate provided with a semiconductor chip. The controller 170 may be implemented by a micro controller unit (MCU). The MCU refers to a control unit in which several modules such as a central processing unit (CPU), a volatile or nonvolatile storage device, one or more ports, and the like are implemented in one or more chips. The MCU may perform various calculations to generate a control signal, and transmit the generated control signal to each component of a home appliance to control the overall operation of the home appliance.

An input unit 171 may receive various instructions related to the refrigerator 100 from a user. The input unit 171 may be implemented using at least one of various physical buttons, knobs, trackballs, track pads, touch pads, and touch screens.

A display unit 172 may display a variety of information related to the refrigerator 100 and provide the information to a user. The display unit 172 may employ at least one of a plasma display panel (PDP), a liquid crystal display (LCD) panel, an organic light emitting display (OLED) panel, a light emitting display (LED) panel, and a touch panel.

A power supply unit 173 may receive commercial power, rectify the received commercial power to obtain electricity of voltage and current required for the refrigerator 100, and transmit the obtained voltage and current to each component of the refrigerator 100.

In addition, the refrigerator 100 may further include a storage device for assisting the operation of the controller 170 or storing a variety of information. The storage device may include at least one of a semiconductor storage device and a magnetic disk storage device.

Hereinafter, a method for controlling a refrigerator will be described.

The control method of the refrigerator may be performed using a refrigerator including a freezer having a refrigeration space and an evaporator that generates cool air to be supplied to the refrigeration space. The control method of the refrigerator may include an operation in which a refrigerant is introduced into a refrigerant evaporation unit of the evaporator and evaporates, an operation in which a phase of a PCM accommodated in a PCM accommodation unit attached to the refrigerant evaporation unit is changed according to latent heat absorbed by the refrigerant, and an operation in which the freezer is operated until a set point of time. Here, the set point of time may be at least one of a point of time when the phase of the PCM is changed and a point of time when the temperature of the refrigeration space reaches a setting temperature.

Hereinafter, a method for controlling a refrigerator will be described in more detail.

First, with reference to FIGS. 27 to 29, a first embodiment of a method for controlling a refrigerator will be described. FIG. 27 is a flowchart showing a first embodiment of a method for controlling a refrigerator, and FIG. 28 is a graph for explaining a first embodiment of a method for controlling a refrigerator. FIG. 28 is a graph showing a temperature change in a control method of a refrigerator according to a first embodiment which takes about 80 minutes in one circulation. The line shown in an upper portion of FIG. 28 shows the temperature change of a refrigeration space 160, and the line shown in a lower portion thereof shows the temperature change of a PCM 112. FIG. 29 is a view for explaining a first embodiment of a method for controlling a refrigerator.

As shown in FIGS. 27 and 29, a freezer 100b may start its operation according to the operation of a refrigerator 100 in operation S200, so that a refrigerant may be introduced into an evaporator 110 in operation S201. Here, the evaporator 110 may include a refrigerant evaporation unit 111 in which a flow passage 111a where a refrigerant evaporates is formed, and a PCM accommodation unit 113 that is coupled to the refrigerant evaporation unit 111 and accommodates the PCM 112 whose phase is changed according to latent heat absorbed by the refrigerant. In addition, the PCM 112 may be brought into direct contact with the flow passage 111a.

Meanwhile, when the freezer 100b starts its operate in operation S200 or the refrigerant is introduced into the evaporator 110 in operation S201, a cooling fan 115 may also start its operation in operation S201, as shown in FIG. 29. According to the embodiments, the cooling fan 115 may be operated from a point of time when the refrigerant evaporates.

The refrigerant may evaporate while absorbing the latent heat in the flow passage 111a in operation S202, and cool air generated by the evaporation of the refrigerant may be introduced into the PCM and accumulated therein, or radiated to the outside in operation S203. Referring to FIG. 28, initially, the PCM 112 may be rapidly cooled by transferring heat to the refrigerant. Meanwhile, the temperature of the refrigeration space 160 may be relatively slowly decreased because the cool air discharged from the refrigerant is accumulated in the PCM 112.

When the phase of the PCM 112 is changed in operation S204 ((X) of FIG. 28) as the PCM 112 solidifies, the freezer 100b may terminate its operation in operation S205. Even in this case, as shown in FIG. 29, the cooling fan 115 may continue to operate in operation S206. Accordingly, the cool air accumulated in the PCM 112 may be continuously introduced into the refrigeration space 160 by the cooling fan 115, and the refrigeration space 160 may be cooled even when the freezer 100b does not operate in operation S207.

When the PCM 112 discharges all of the accumulated cool air and the phase of the PCM 112 is changed again ((Y) in FIG. 28), the cooling fan 115 may terminate its operation in operation S208. The temperature inside the refrigeration space 160 may begin to rise according to the exhaustion of the cool air accumulated in the PCM 112 and the end of the operation of the cooling fan 115 in operation S216.

When the temperature inside the refrigeration space reaches a predetermined operating temperature in operation S211, the freezer 100b may start to operate again as shown in FIGS. 28 and 29, and the refrigerant may be introduced into the flow passage 111a of the evaporator 110. Accordingly, the temperature inside the refrigeration space 160 may be adjusted while the above-described operations S200 to S210 are repeated.

The above-described circulation may be performed for a time of about 80 minutes. In other words, it may take about 80 minutes until the freezer repeatedly operates in operation S209 from the operation S210 of the freezer of the first embodiment of the control method of the refrigerator. However, the time required for the one circulation is not limited thereto, and may be changed according to various conditions such as the selection of the user or the designer, the characteristics of the refrigerator 100, and the operation state of the refrigerator 100.

Hereinafter, a second embodiment of a method for controlling a refrigerator will be described with reference to FIGS. 30 to 32. FIG. 30 is a flowchart showing a second embodiment of a method for controlling a refrigerator, and FIG. 31 is a graph for explaining a second embodiment of a method for controlling a refrigerator. FIG. 31 is a graph showing a temperature change in a control method of a refrigerator according to a second embodiment which takes about 90 minutes in one circulation. The line shown in an upper portion of FIG. 31 shows the temperature change of a refrigeration space 160, and the line shown in a lower portion thereof shows the temperature change of a PCM 112. FIG. 32 is a view for explaining a second embodiment of a method for controlling a refrigerator.

As shown in FIGS. 30 to 32, a freezer 100b may start its operation according to the operation of a refrigerator 100 in operation S220, so that a refrigerant may be introduced into a flow passage 111a of an evaporator 110 in operation S221. The evaporator 110 may include a refrigerant evaporation unit 111 in which the flow passage 111a where a refrigerant evaporates is formed, and a PCM accommodation unit 113 that is coupled to the refrigerant evaporation unit 111 and accommodates the PCM 112 whose phase is changed according to latent heat absorbed by the refrigerant. The PCM 112 may be brought into direct contact with the flow passage 111a.

When the freezer 100b starts its operation in operation S220 or the refrigerant is introduced into the evaporator 110, a cooling fan 115 may also start its operation in operation S221, as shown in FIG. 32.

The refrigerant may evaporate while absorbing the latent heat in the flow passage 111a in operation S222, and cool air generated by the evaporation of the refrigerant may be introduced into the PCM 112 and accumulated therein, or radiated to the outside in operation S223. Referring to FIG. 31, initially, the PCM 112 may be rapidly cooled by transferring heat to the refrigerant. Meanwhile, the temperature of the refrigeration space 160 may be initially relatively slowly cooled than the PCM 112 because the cool air discharged from the refrigerant is accumulated in the PCM 112, and rapidly cooled according to a phase change of the PCM 112.

The freezer 100b may continuously operate until the temperature of the freezer 100b reaches a setting temperature, and the cool air may be continuously discharged from the evaporator 110 in operation S224. The freezer 100b may continuously operate even when the phase of the PCM 112 is changed. The PCM 112 may be continuously cooled by the cool air discharged from the refrigerant even after the phase of the PCM 112 is changed.

When the temperature inside the refrigeration space 160 reaches a setting temperature, for example, 1 degree Celsius in operation S225, as shown in FIG. 28, the freezer 100b may terminate its operation. In this case, as shown in FIG. 33, the cooling fan 115 may also terminate its operation in operation S226.

The temperature inside the refrigeration space 160 may rise according to the end of the operation of the freezer 100b and the cooling fan 115 in operation S228, as shown in FIG. 31. Meanwhile, since the cool air transferred from the refrigerant is accumulated in the PCM 112, the cool air accumulated in the PCM 112 may be supplied into the refrigeration space 160. Accordingly, the temperature inside the refrigeration space 160 may rise more slowly than when the cool air accumulated in the PCM 112 is not supplied. Accordingly, since the operating period of the freezer 100b becomes long, the power consumed by the freezer 100b may be reduced. In addition, since the number of operations of the freezer 100b is relatively reduced, the depreciation of each component of the freezer 100b may also be reduced.

When the temperature inside the refrigeration space rises and reaches a predetermined operating temperature, for example, 5 degrees Celsius in operation S219, the freezer 100b and the cooling fan 115 may operate again as shown in FIGS. 31 and 32, and the refrigerant may be introduced into the flow passage 111a of the evaporator 110. Accordingly, the temperature inside the refrigeration space 160 may be adjusted while the above-described operations S220 to S228 are repeated in operation S227.

The time required for one circulation of the control method of the refrigerator according to the second embodiment may be different from the time required for one circulation of the control method of the refrigerator according to the first embodiment. For example, it may take about 90 minutes longer than the case of the first embodiment until the freezer repeatedly operates in operation 227 from the operation S220 of the freezer of the second embodiment of the control method of the refrigerator. However, the time required for the one circulation is not limited thereto, and may be changed according to various conditions such as the selection of the user or the designer, the characteristics of the refrigerator 100, and the operation state of the refrigerator 100.

Hereinafter, a third embodiment of a method for controlling a refrigerator will be described with reference to FIGS. 33 to 35. FIG. 33 is a flowchart showing a third embodiment of a method for controlling a refrigerator, and FIG. 34 is a graph for explaining a third embodiment of a method for controlling a refrigerator. FIG. 34 is a graph showing a temperature change in a control method of a refrigerator according to a third embodiment which takes about 90 minutes in one circulation. The line shown in an upper portion of FIG. 34 shows the temperature change of a refrigeration space 160, and the line shown in a lower portion thereof shows the temperature change of a PCM 112. FIG. 35 is a view for explaining a third embodiment of a method for controlling a refrigerator.

Referring to FIG. 33, a freezer 100b may start its operation according to the operation of a refrigerator 100 in operation S230, so that a refrigerant may be introduced into a flow passage 111a of an evaporator 110 in operation S231. Here, the evaporator 110 may include a refrigerant evaporation unit 111 in which the flow passage 111a where a refrigerant evaporates is formed, and a PCM accommodation unit 113 that is coupled to the refrigerant evaporation unit 111 and accommodates the PCM 112 whose phase is changed according to latent heat absorbed by the refrigerant. The PCM 112 may be brought into direct contact with the flow passage 111a.

When the freezer 100b starts its operation in operation S230 or the refrigerant is introduced into the evaporator 110, a cooling fan 115 may also start its operation in operation S231, as shown in FIG. 35.

The refrigerant may evaporate while absorbing the latent heat in the flow passage 111a, and cool air generated by the evaporation of the refrigerant may be introduced into the PCM 112 and accumulated therein, or radiated to the outside in operation S232. Referring to FIG. 34, initially, the PCM 112 may be rapidly cooled by transferring heat to the refrigerant. The temperature of the refrigeration space 160 may be initially relatively slowly cooled because the cool air discharged from the refrigerant is accumulated in the PCM 112.

The freezer 100b may continuously operate until the temperature of the freezer 100b reaches a setting temperature set by the designer or the user, and the evaporator 110 may continuously discharge cool air in operation S233. In the same manner as described above, the freezer 100b may operate continuously even when the phase of the PCM 112 starts to be changed or while the phase thereof is changed, thereby discharging the cool air. The PCM 112 may be continuously cooled by the cool air discharged from the refrigerant according to the operation of the freezer 100b even after the phase is changed.

When the temperature inside the refrigeration space 160 reaches the setting temperature, for example, 1 degree Celsius in operation S234, as shown in FIG. 34, the freezer 100b may terminate its operation in operation S235. At this point, the cooling fan 115 may continue to operate in operation S236 despite the termination of the operation of the freezer 100b, as shown in FIG. 35.

Since the cool air is accumulated in the PCM 112, the cool air accumulated in the PCM 112 may be discharged from the evaporator 110 in operation S237 even after the freezer 100b terminates its operation. The cooling fan 115 may cause the cool air accumulated in the PCM 112 to be continuously introduced into the refrigeration space 160. In this case, since the cooling fan 115 causes the cool air accumulated in the PCM 112 to be introduced into the refrigeration space 160, the temperature inside the refrigeration space 160 may rise slowly or may not rise for a predetermined period of time.

The cooling fan 115 may stop its operation under certain conditions in operations S238 and S239. For example, the cooling fan 115 may stop its operation depending on the temperature of the PCM 112. More specifically, when the temperature of the PCM 112 rises above a temperature defined in advance by a designer or a user in operation S238, the cooling fan 115 may terminate its operation in operation S239. According to the embodiments, the cooling fan 115 may stop its operation after a predetermined time has elapsed, or stop its operation according to a change in the temperature inside the refrigeration space 160. The cooling fan 115 may stop its operation when it is determined that the cool air accumulated in the PCM 112 is all exhausted.

When the operation of the cooling fan 115 is terminated, the temperature inside the refrigeration space 160 may begin to rise more sharply in operation S241, as shown in FIG. 34. According to the embodiments, when the cool air transferred from the refrigerant is still accumulated in the PCM 112, the cool air accumulated in the PCM 112 may be supplied into the refrigeration space 160 to slow down the rate of temperature rise.

When the temperature inside the refrigeration space rises and reaches a predetermined operating temperature, for example, 5 degrees Celsius in operation S242, the freezer 100b and the cooling fan 115 may start their operations again as shown in FIGS. 34 and 35. Accordingly, the temperature inside the refrigeration space 160 may be adjusted while the above-described operations S230 to S242 are repeated in operation S240.

The time required for one circulation of the control method of the refrigerator according to the third embodiment may be different from the time required for one circulation of the control method of the refrigerator according to the first embodiment. For example, it may take about 90 minutes until the freezer repeatedly operates in operation 240 from the operation S230 of the freezer of the control method of the refrigerator according to the third embodiment, unlike the one circulation of the control method of the refrigerator according to the first embodiment. However, the time required for the one circulation is not limited thereto, and may be changed according to various conditions such as the selection of the user or the designer, the characteristics of the refrigerator 100, and the operation state of the refrigerator 100.

The control method of the refrigerator described above can be applied to various devices for cooling or freezing an object to be cooled using a cooling cycle. For example, the control method of the refrigerator described above can be applied even to a method for controlling an air conditioner, in the same manner or a partially modified manner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

INDUSTRIAL APPLICABILITY

The disclosed embodiment relates to an evaporator that can be applied to a refrigerator or an air conditioner, a refrigerator using the evaporator, and a control method of the refrigerator, which are industrially applicable.

The invention claimed is:

1. An evaporator comprising:
a refrigerant evaporation unit including a flow passage in which a refrigerant evaporates; and
a plurality of phase change material (PCM) accommodation units coupled to the refrigerant evaporation unit and configured to accommodate a plurality of PCMs, wherein each of the plurality of PCM accommodation units is configured to accommodate a corresponding respective one of the plurality of PCMs, wherein the refrigerant evaporation unit is disposed between at least two of the plurality of PCMs and disposed to form at least one side wall of an accommodation space inside each of at least two of the plurality of PCM accommodation units, and wherein each of the plurality of PCM accommodation units includes:
an outer housing containing the corresponding respective one of the plurality of PCMs against the refrigerant evaporation unit and including a protrusion protruding from the outer housing away from the refrigerant evaporation unit in correspondence with the flow passage,
wherein the accommodation space is provided between the outer housing and the refrigerant evaporation unit and accommodates the corresponding respective one of the plurality of PCMs, and
wherein each of the plurality of PCMs is disposed to be in direct contact with an outer surface of the refrigerant evaporation unit inside a corresponding respective one of the plurality of PCM accommodation units.

2. The evaporator of claim 1, wherein each of the plurality of PCM accommodation units is coupled to at least one surface of a plurality of outer surfaces of the refrigerant evaporation unit.

3. The evaporator of claim 1, wherein each of the plurality of PCM accommodation units further includes a side housing disposed on a periphery of a boundary of the outer housing and the refrigerant evaporation unit and seals the accommodation space by coupling the outer housing and the refrigerant evaporation unit.

4. The evaporator of claim 3, wherein each of the plurality of PCM accommodation units further includes an injection port that passes through the side housing to be connected to the accommodation space and through which the corresponding respective one of the plurality of PCMs injected into the accommodation space passes.

5. The evaporator of claim 4, wherein each of the plurality of PCM accommodation units further includes an air discharge port that passes through the side housing to be connected to the accommodation space and through which air inside the accommodation space is discharged.

6. The evaporator of claim 1, wherein each of the plurality of PCM accommodation units further includes a support disposed in the accommodation space and configured to couple and fix the outer housing and the refrigerant evaporation unit.

7. The evaporator of claim 1, wherein each of the plurality of PCMs is changed from a liquid state to a solid state at a temperature of 0 degrees Celsius or less.

8. A refrigerator comprising:
a refrigeration space;
a freezer including an evaporator configured to generate cool air supplied to the refrigeration space by circulating a refrigerant; and
a controller configured to control an operation of the freezer,
wherein the evaporator includes:
a refrigerant evaporation unit having a flow passage in which the refrigerant evaporates,
a plurality of phase change materials (PCMs), and a plurality of PCM accommodation units coupled to the refrigerant evaporation unit and configured to accommodate the plurality of PCMs such that the refrigerant evaporation unit is disposed between at least two of the plurality of PCMs and disposed to form at least one side wall of an accommodation space inside each of at least two of the plurality of PCM accommodation units, wherein each of the plurality of PCM accommodation units is configured to accommodate a corresponding respective one of the plurality of PCMs, and wherein each of the plurality of PCM accommodation units includes:
an outer housing containing the corresponding respective one of the plurality of PCMs against the refrigerant evaporation unit and including a protrusion protruding from the outer housing away from the refrigerant evaporation unit in correspondence with the flow passage,
wherein the accommodation space is provided between the outer housing and the refrigerant evaporation unit and accommodates the corresponding respective one of the plurality of PCMs, and
wherein each of the plurality of PCMs is disposed to be in direct contact with an outer surface of the refrigerant evaporation unit inside a corresponding respective one of the plurality of PCM accommodation units.

9. The refrigerator of claim 8, wherein the freezer further includes a compressor configured to compress the refrigerant discharged from the evaporator, a condenser configured to condense the refrigerant compressed in the compressor, and an expansion valve configured to inject the condensed refrigerant into the evaporator.

10. The refrigerator of claim 8, wherein the controller configured to:
operate the freezer until a phase of each of the plurality of PCMs is changed,
operate the freezer until a temperature of the refrigeration space reaches a setting temperature, and
control the cool air to be supplied to the refrigeration space by operating the freezer when a temperature of the refrigeration space is higher than a predetermined operating temperature.

11. The refrigerator of claim 8, further comprising:
a cooling fan configured to blow and supply the cool air to the refrigeration space,
wherein the controller further configured to:
operate the cooling fan until a temperature of the refrigeration space reaches a setting temperature,
operate the cooling fan according to the operation of the freezer, and
operate the cooling fan even after the operation of the freezer is terminated.

12. A method for cooling a refrigerator, the refrigerator including a freezer having a refrigeration space and an evaporator for generating cool air supplied to the refrigeration space, the method comprising:
introducing a refrigerant into the evaporator and evaporating the refrigerant, the evaporator comprising:
a refrigerant evaporation unit including a flow passage in which the refrigerant evaporates, and
a plurality of PCM accommodation units coupled to the refrigerant evaporation unit and configured to accommodate a plurality of PCMs such that the refrigerant evaporation unit is disposed between at least two of the plurality of PCMs and disposed to form at least one side wall of an accommodation space inside each of at least two of the plurality of PCM accommodation units, wherein each of the plurality of PCM accommodation units is configured to accommodate a corresponding respective one of the plurality of PCMs, and wherein each of the plurality of PCM accommodation units includes:
an outer housing containing the corresponding respective one of the plurality of PCMs against the refrigerant evaporation unit and including a protrusion protruding from the outer housing away from the refrigerant evaporation unit in correspondence with the flow passage,
wherein the accommodation space is provided between the outer housing and the refrigerant evaporation unit and accommodates the corresponding respective one of the plurality of PCMs, and
wherein each of the plurality of PCMs is disposed in direct contact with an outer surface of the refrigerant evaporation unit, which is disposed inside the plurality of PCM accommodation units;
changing a phase of each of the plurality of PCMs accommodated in a corresponding respective one of the plurality of PCM accommodation units attached to the refrigerant evaporation unit according to latent heat absorbed by the refrigerant; and
operating the freezer up to a setting point of time.

13. The method of claim 12, further comprising:
starting an operation of the freezer when a temperature of the refrigeration space is higher than a predetermined temperature.

14. The method of claim 12, further comprising:
operating a cooling fan for blowing and supplying the cool air to the refrigeration space.

15. The method of claim 14, further comprising:
operating the cooling fan until a temperature of the refrigeration space reaches a setting temperature.

16. The method of claim 14, further comprising:
terminating an operation of the cooling fan when an operation of the freezer is terminated.

17. The method of claim 14, further comprising:
additionally operating the cooling fan even after the operation of the freezer is terminated.

18. The method of claim 14, further comprising:
terminating an operation of the cooling fan when a temperature of each of the plurality of PCMs is higher than a predetermined temperature.

* * * * *